United States Patent
Blackmore

(10) Patent No.: US 7,628,949 B2
(45) Date of Patent: Dec. 8, 2009

(54) METHOD AND APPARATUS OF CURING CONCRETE STRUCTURES

(75) Inventor: Richard D. Blackmore, Houston, TX (US)

(73) Assignee: Energy Maintenance Service / LLC, Houston, TX (US)

( * ) Notice: Subject to any disclaimer, the term of this patent is extended or adjusted under 35 U.S.C. 154(b) by 520 days.

(21) Appl. No.: 10/559,601

(22) PCT Filed: Jun. 4, 2004

(86) PCT No.: PCT/US2004/017794

§ 371 (c)(1),
(2), (4) Date: Sep. 8, 2006

(87) PCT Pub. No.: WO2004/108623

PCT Pub. Date: Feb. 16, 2004

(65) Prior Publication Data

US 2006/0119011 A1 Jun. 8, 2006

Related U.S. Application Data

(60) Provisional application No. 60/475,757, filed on Jun. 4, 2003.

(51) Int. Cl.
*B29C 70/02* (2006.01)
(52) U.S. Cl. .............. 264/426; 264/449; 264/40.6; 264/333
(58) Field of Classification Search ............. 264/426, 264/449, 333, 40.6
See application file for complete search history.

(56) References Cited

U.S. PATENT DOCUMENTS

| 828,976 | A | | 8/1906 | Schneider |
| 1,989,736 | A | * | 2/1935 | Boyles ............... 264/430 |
| 2,133,810 | A | * | 10/1938 | Craigue ............. 264/413 |
| 2,643,434 | A | * | 6/1953 | Scharf .............. 264/431 |
| 2,841,856 | A | * | 7/1958 | Gelbman ........... 264/426 |
| 3,649,725 | A | * | 3/1972 | Olson ............... 264/40.6 |
| 3,797,928 | A | * | 3/1974 | Kinoshita et al. ... 399/153 |
| 3,907,951 | A | * | 9/1975 | Godley ............. 264/40.6 |
| 4,560,428 | A | * | 12/1985 | Sherrick et al. ..... 156/94 |

(Continued)

OTHER PUBLICATIONS

U.S. Appl. No. 10/182,968, filed Sep. 11, 2003, Richard Blackmore.

(Continued)

*Primary Examiner*—Joseph S Del Sole
*Assistant Examiner*—Timothy Kennedy
(74) *Attorney, Agent, or Firm*—David McEwing

(57) ABSTRACT

A method of controlling the cure of concrete structures using intralaminar heat generated by applying electrical energy to electrically conductive members disposed within the structures. These conductive members include carbon fibers. The method further incorporates the electrically conductive, members as internal reinforcement in the cured, finished structure reducing or obviating the need for reinforcing steel. The electrically conductive, members are provided in various forms including but not limited to, pliable forms impregnated with a polymer resin matrix capable of being rigidified and completely rigidified forms. The invention may be used in conjunction with heat responsive agents to activate curing. A preferred embodiment of the method according to the invention is a controlled (expedited or heat activated) cure of a concrete structure. Concrete structures containing the electrical heating capability taught herein are also included within the invention.

14 Claims, 23 Drawing Sheets

U.S. PATENT DOCUMENTS

| | | | |
|---|---|---|---|
| 4,599,211 A * | 7/1986 | Wise et al. | 264/82 |
| 4,627,998 A * | 12/1986 | Akihama et al. | 428/294.7 |
| 4,781,994 A | 11/1988 | Enoki | |
| 5,271,193 A | 12/1993 | Olsen | |
| 5,308,696 A | 5/1994 | Hanashita | |
| 5,565,535 A | 10/1996 | Costin | |
| 5,648,137 A | 7/1997 | Blackmore | |
| 5,679,149 A * | 10/1997 | Tezuka et al. | 106/644 |
| 5,685,902 A | 11/1997 | Tezuka | |
| 5,846,317 A * | 12/1998 | Sattler et al. | 106/778 |
| 6,123,879 A | 9/2000 | Hendrix | |
| 6,277,771 B1 | 8/2001 | Nishimura | |
| 6,612,085 B2 | 9/2003 | Edwards | |
| 2003/0200903 A1 * | 10/2003 | Mattus | 106/802 |
| 2004/0099982 A1 * | 5/2004 | Sirola et al. | 264/105 |

OTHER PUBLICATIONS

Anton K. Schindler & B. Frank McCullough, The Importance of Temperature Control During Concrete Pavement Construction in Hot Weather Conditions, Jan. 2002, 16 pgs.

Anton K. Schindler, "Effect of Temperature on the Hydration of Cementitious Materials" 2004, 33 pgs.

Collier et al. "Understanding Textiles" 6th Edition 2001 p. 204.

Peters "Handbook of Composites" 2nd Edition, 1998 p. 170.

* cited by examiner

Carbon Fiber Heating Properties

Time to Temperature & Heat Transfer Rates
Summary of Results
*Data supplied by Reichhold Chemical*

| Fiber Architecture | Volts | Amps | Watts per foot | Time in minutes | Temp |
|---|---|---|---|---|---|
| 2P50K | 5 | 20 | 100 | 10 | 130F |
| 2P50K | 5 | 25 | 125 | 10 | 162F |
| 1P6K | 5 | 10 | 50 | 15 | 274F |
| 2P6K | 5 | 10 | 50 | 15 | 205F |
| 2P6K | 5 | 15 | 75 | 15 | 280F |
| 2P6K | 5 | 20 | 100 | 15 | 300F |
| 3KUNI | 4 | 15 | 60 | 10 | 115F |
| 3KUNI | 5 | 20 | 100 | 10 | 145F |
| 6P12KCL | 4 | 15 | 60 | 15 | 160F |
| 6P12KCL | 4 | 20 | 80 | 12 | 176F |
| 6P12KCL | 5 | 25 | 125 | 12 | 239F |
| 3P12KTRIAX | 5 | 10 | 50 | 10 | 184F |
| 3P12KTRIAX | 5 | 20 | 100 | 15 | 300F |
| AL Coated Glass 3 | 5 | 20 | 100 | 15 | 250F |
| Copper Screen | 1.5 | 70 | 105 | 5 | 85F |

The above table contains test results verified at Reichhold Chemical. The basis of comparison is as follows: 2 square foot piece of carbon fabric drew 100 watts and achieved 130F in 10 minutes.

FIG. 2C  Prior Art

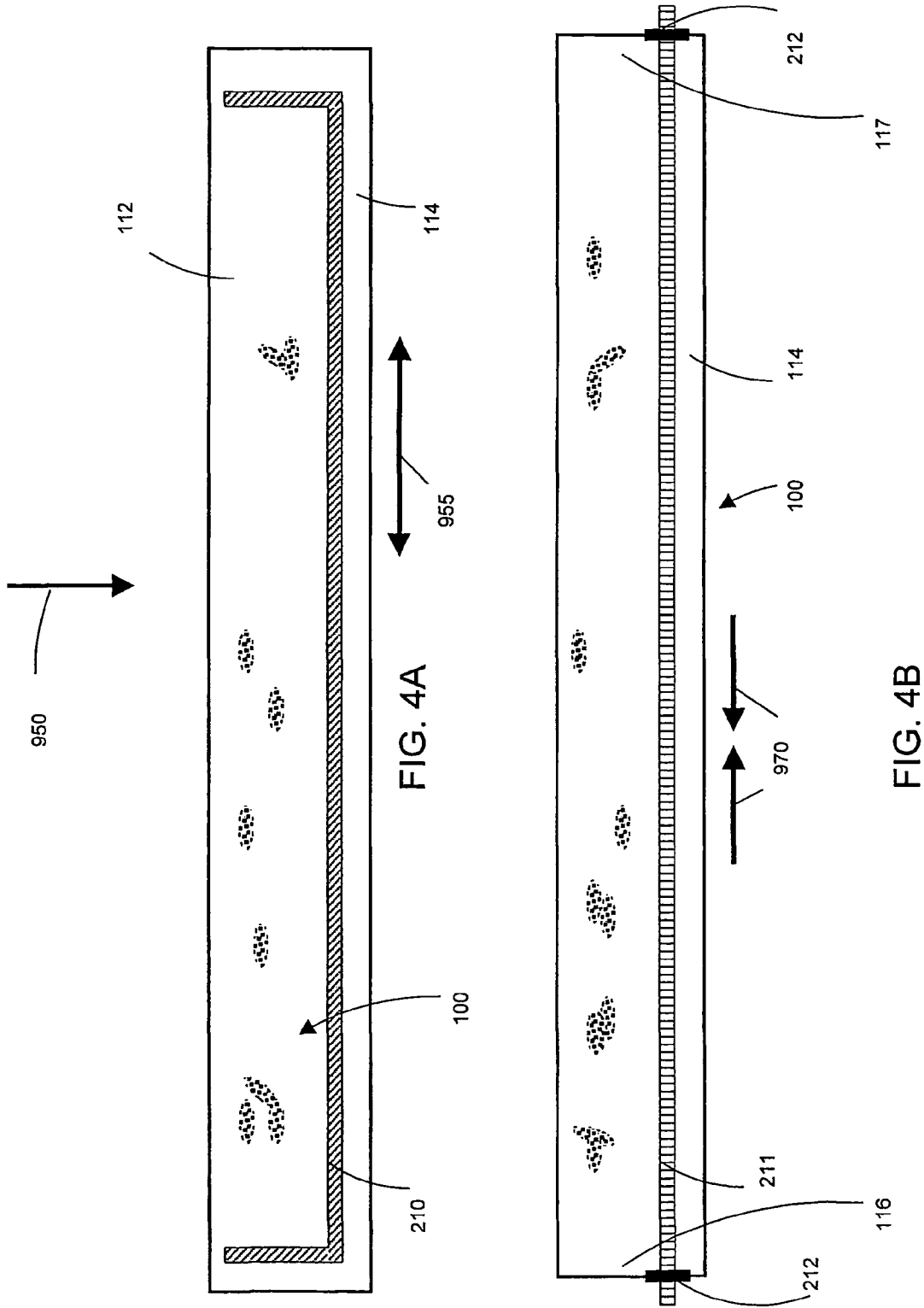

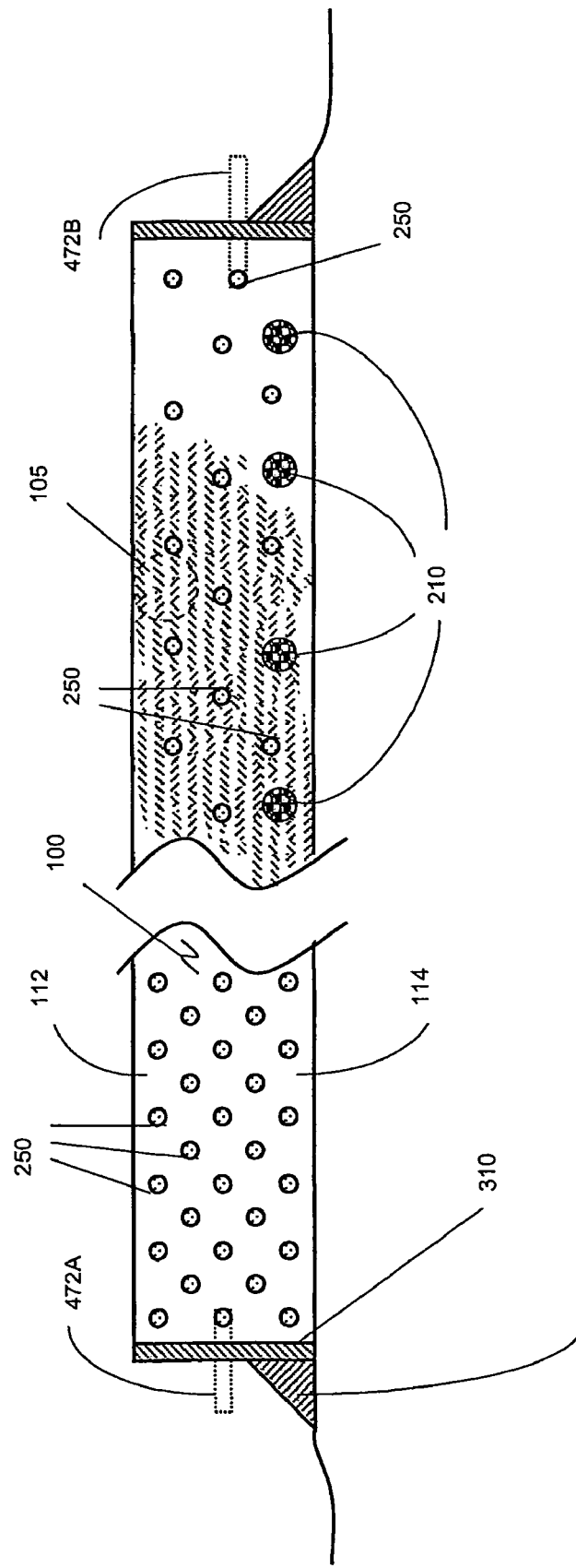

METHOD AND APPARATUS OF CURING CONCRETE STRUCTURES

CROSS REFERENCE TO RELATED APPLICATIONS

This application claims the benefit of and priority to U.S. Provisional Application No. 60/475,757 entitled "A Method of Curing Concrete Structures" filed Jun. 4, 2003.

BACKGROUND OF THE INVENTION

1. Field of Use

The invention pertains to a novel method of curing concrete mixtures utilizing electrically conductive components placed within the concrete, such as conductive wire or fibers, in a circuit path and using electrical current to create resistive or impedance heating to control the cure of the concrete. This invention pertains to hydraulic cements such as Portland cement, pozzolana ("Roman cement") and calcium aluminate, as well as resinous cements as heat, moisture and catalytic curing cements, fireclays, kaolin, low alumina clays, and gypsum. Resinous cement materials may be enclosed in hydraulic cement or gypsum covers.

The method taught by this invention can selectively elevate the concrete temperature during setting and hardening to achieve optimum gain of material strength or to accelerate the cure (percentage of hydration) of concrete structures using intra-laminar heat generated by applying electrical energy to electrically conductive members disposed within the structures. The method may also be used in conjunction with concrete containing polymer, wherein the polymer is a catalyst that retards curing until induced by a specified temperature being achieved. This prevents the initiation of auto-accelerated curing in a large mass concrete pour such as in large foundations, footings, retaining walls, etc. The method further incorporates the electrically conductive members as internal reinforcement in the cured, finished structure reducing or obviating the need for reinforcing steel. The heatable and electrically conductive members are provided in various forms including but not limited to pliable forms impregnated with a polymer resin matrix capable of being rigidified during cure and in completely rigidified forms installed prior to the pour of cement mixture. The electrically conductive members may also be affixed to reinforcing steel prior to the concrete pour.

An application of the method of the invention is expedited curing of concrete for use in pre-formed manufactured structures and in tilt-up ("tilt wall") construction. The invention also pertains to novel concrete products containing the electrically conductive, resistively heatable fibers such as foundation, footing, floor, piers, retaining walls, and slab structures, tilt wall structures, and pre-formed manufactured concrete structures. The electrically conductive fibers can be utilized post cure for heating of the structure or for radiant heating of space. This capability could be used for de-icing of concrete paved surfaces such as roads, walkways, bridges and runways.

2. Background of the Invention

Concrete consists of a mixture of cement, sand, and an aggregate of small stones. When water is added to a dry concrete mix, the cement paste formed should fully coat all sand and aggregate particles, and fill in the void spaces between aggregate particles. The cement paste hardens, owing to the hydration reactions, and bonds the inert sand and aggregate together.

Cement materials such as Portland cement are inexpensive, excellent in durability, fire resistance and other physical properties such as compression strength and stiffness. These materials have been widely used as a building and construction material. However materials made of cement have low tensile strength and impact resistance relative to the compression strength. Concrete materials also have low heat transfer or heat dispersion capabilities. The material also has poor energy absorption. Therefore cement materials are considered to be brittle. Energy absorption, impact resistance and tensile strength are improved by the introduction of reinforcing steel; typically steel rods made from mild steel and commonly termed "rebar". Mild steel contains 0.08 to 0.15% carbon with tensile strength within the range of 300 to 900 $MN/m^2$.

By way of general background, Portland cement powder is made by firing a mixture of limestone with shale or clay in a rotating kiln. The maximum temperature in the cement kiln is about 950° C. (1742° F.), and at this temperature the lime and clay partially fuse together as a hard clinker. Cement clinker is ground into powder and mixed with a small amount of gypsum (calcium sulfate) to produce dry cement powder. The function of the gypsum is to control the setting characteristics of the cement.

When cement powder is mixed with water a series of complex chemical reactions occurs ("curing"), forming hydrated silicates and aluminates of calcium. (Curing is sometimes referred to as treatment or protection of concrete during the hardening period. However it is used herein as the hydration process.) It is this curing process that causes the wet cement to set and harden as a rigid material. The conditions under which this curing occurs can impact the resultant properties of the cement structure. Some of the hydration reactions take place very slowly and, although the cement will set fairly rapidly, great strength and hardness will not be developed for several days, or weeks, depending on the composition of the cement, the moisture content, and the temperature. The final properties of a concrete will be dependent on a number of factors, including the relative proportions of water, cement, polymer, sand and aggregate in the material, the average size of aggregate particles, the type of aggregate stone used, and the surface texture of the aggregate. The maximum strength of the concrete is achieved upon completion of the cure. (Uncured concrete is sometimes referred to as "green concrete.")

The speed at which this curing (hydration reaction) occurs is dependent on temperature. At a minimum ambient temperature of 73° F. (23° C.), a waiting period of between five and ten days (120 to 240 hours) must be observed to allow the concrete to attain at least 75% of the design strength (usually 2500-PSI compressive strength). This process is slowed considerably at temperatures below 73° F. resulting in cost increases and scheduling delays.

The moisture content of the cement during curing is important. If there is insufficient water (moisture), full hydration of the cement particles will not occur. For full hydration and the development of maximum strength, a water/cement ratio of about 0.4/1 is necessary. If the water/cement ratio is much in excess of this value the strength of the hardened cement will be reduced.

Recently published studies have reported the effects of temperature on the final compressive strength of cured concrete. If the temperature is either too low or too high, less than optimum compressive strength is achieved. For example in a paper published in 2004 and entitled "Effect of Temperature on the Hydration of Cementitious Materials", Anton K. Schindler of Auburn University reports that compressive strength for a mortar mixture cured at 50° C. (122° F.) may be 17 percent lower than the compressive strength achieved by the same mortar mixture cured at room temperature (20° C. or 68° F.). This paper adopts work of Kjellsen and Detwiler, 1993. Published papers also state that although increasing concrete temperature during cure speeds the rate of reaction, the hydration reaction does ultimately go to substantial completion regardless of the temperature during curing.

The compressive strengths of plain concrete may be up to 65 $MN/m^2$, in comparison with a compressive strength of about 100 $MN/m^2$ for hardened cement. Other published sources state paving concrete typically has compressive strength of between 3,000 (20.7 $MN/m^2$) and 5,000 psi (34.5 $MN/m^2$). High strength concrete is also defined as having a compressive strength of at least 6,000 psi (41.4 $MN/m^2$) and concrete having compressive strength of 20,000 psi (137.9 $MN/m^2$) have been used in building applications. The strength of concrete in tension, however, is only about one-tenth of the value of compressive strength.

When concrete is subjected to stress (defined as the internal force within a material in balance with an externally applied load), failure probably commences at the interface between aggregate and cement. Aggregate particles with rough surfaces will give concrete of higher strength than will smooth-surfaced aggregate. The tensile strength of concrete (maximum extending load sustained by concrete prior to destruction) is low (up to 5 $MN/m^2$) and, to overcome this disadvantage, concrete fabrications are very often reinforced with steel, typically mild steel in the form of rods ("rebar"). In plain reinforced concrete, a network of steel rods or bars is assembled and the concrete is allowed to set around this framework. The steel reinforcement is positioned in the portion of the concrete member that will be subjected to tensile stresses. For example, in a simply supported beam, the steel lies along the lower portion of the beam. There is a purely mechanical bonding between concrete and steel, and the reinforcement bars are often twisted, or possess surface projections (these may be formed by rolling the bars through patterned rolls) in order to increase the adhesion between steel and concrete.

Another form of reinforced concrete is known as pre-stressed concrete. The concrete is put into a state of compression by means of highly stressed steel wires. When a pre-stressed concrete beam is in service, the initial compressive stresses must be overcome before tensile stresses can be developed within the material. Concrete may be pre-stressed by pre-tensioning, or by post-tensioning. In the former method steel wires are placed in tension before being surrounded by concrete. The externally acting stress on the steel is removed when the concrete has set. In post-tensioning, the concrete is allowed to set and harden around a tube, or tubes. Steel wires are then put through the tubes and these wires are stretched and anchored to the concrete.

The reinforcement of concrete with carbon or other fibers has been studied at least as early as 1994. U.S. Pat. No. 5,308,696 teaches dispersing short carbon fibers (1.0 to 6.0 mm) into an uncured concrete mixture. The concentration of fibers in the mixture may be 20% by volume. U.S. Pat. No. 5,685,902 teaches use of carbon fibers dispersed within a concrete mixture that is cured for 4 weeks (approximately 650 hours) at 20° C. (68° F.). U.S. Pat. No. 6,612,085 teaches use of fibrous composite materials formed in the shape of traditional rebar. The patent claims use of glass and carbon fibers within the "composite rebar".

The present invention relates generally to a method for expediting the cure of concrete structures while achieving the optimum final compressive strength. An embodiment of the invention relates particularly to the curing of large concrete wall panels used in tilt-up construction practices. One of the advantages of the tilt-up process is the shortened construction times; often only requiring 4-6 weeks for completion. Certain disadvantages exist though in the limitations in geometry due to the inherent properties of concrete reinforced with steel. In tilt-up construction, relatively thin (3.0"-8.0") wall panels are cast horizontally at ground level and raised into the vertical position by tilting the panel about one end by lifting from the opposite end. The structure is then lifted into a final position to form a structural wall element. Typically, this procedure is performed at the building site with the forms and molding surfaces constructed atop the floor slab, which has first been poured on a prepared sub-grade. With the molding forms positioned, steel reinforcing members are located within the panel area and concrete is poured or pumped into the area defined by the forms. Before the wall elements can be erected, sufficient time must be allowed for the concrete to gain enough strength to withstand the lifting stresses.

Another construction method for producing large, concrete structures involves the casting or molding of the structures at a central location. Once a satisfactory strength level is achieved, the structures are removed from their molds and transported to the erection site. This process does lend itself to a somewhat more controlled environment but does not provide for ideal curing conditions. Large and irregular shaped concrete structures comprising concrete must still observe the basic hydration reaction schedules and are typically less cost effective due to transportation costs. Construction of concrete structures during extreme cold may even become impossible because the water, necessary for cure, can freeze at low ambient temperatures.

In order to accelerate the curing of concrete structures, it has become customary to incorporate additives into the concrete mixture to prevent or retard freezing and alternately provide a heating means so that the concrete will cure more rapidly and thereby facilitate an increase in productivity. Other methods simply employ thermally insulated blankets or covers to contain some of the heat generated naturally by the hydration reaction process. Heating means have historically been through the introduction of steam or pressurized, heated water into an enclosure surrounding the curing forms containing the poured concrete, the use of tubes or conduits that convey a heat transfer medium from a central boiler unit to the surface of the structure or its surrounding mold or form, and even electrically heated molds and forms. See, for example, paragraphs 64 through 85 of the application US 2003/0168164 A1 of Blackmore et al published Sep. 11, 2003.

All of these methods, though addressing the problems with novel and somewhat effective means, are labor intensive and fail to provide an inexpensive, expedient cure mechanism for concrete structures. A heat transfer must still take place from the external heat source through a conveyance apparatus and ultimately through the cross sectional area of the concrete structure in order to accelerate the cure. This process suffers from exorbitant heat loss to the atmosphere. The apparent need exists for a concrete heating method that is energy efficient and economical to implement; ultimately reducing cycle times, labor and finished construction costs. There is also a need for concrete structures that can internally and controllably heated.

It is the principal objective of the present invention to demonstrate an efficient means for controllably introducing heat to concrete structures during cure. It is another object to accelerate the time required to cure concrete. It is another object to provide a heating means that can also provide internal reinforcement to the completed structure. It is another principal objective of the invention to form an improved concrete structure.

SUMMARY OF THE INVENTION

The present invention relates generally to a method for expediting the cure of concrete structures and more particularly to the curing of large concrete wall panels used in tilt-up construction practices. The method relates to insitu heating during cure of concrete structures. By strategically placing electrically conductive and resistively heatable components in a conductive circuit path through the thickness of a concrete structure and that can be connected to an external power source, it is possible to exploit the electrical resistivity of these components and employ them as heating members. By having the heating components internally placed within the concrete, the power requirement may be significantly reduced. The internal positioning of the heating members also affords a synergistic result in that these members remain as reinforcement in the finished structure.

The invention also pertains to controlling the rate of cure of concrete by starting an initial rate of cure at an elevated temperature, and then controllably withdrawing the resistive heat to maintain a desired rate of cure, consistent with maximizing the final concrete compressive strength. Further, the invention may be used in conjunction with known concrete additives that retard auto-acceleration of the hydration (curing) reaction in a large mass concrete pour until an necessary elevated activation energy is achieved. Such catalyst additives are used in conjunction with polymer concrete mixtures. Polymer mixtures may be used in heavy mass pours, such as footings, floors, piers, retaining walls and slabs, where it is desired that the heat of reaction not drive the curing to a rate detrimental to the concrete strength.

An electrical component subject of the invention is a rod, wire or fiber containing carbon or graphite (collectively termed "carbon"), such as carbon fiber woven into a braid, fabric or tape. Carbon fibers are electrically conductive and heatable without loss of material properties, have a low coefficient of thermal expansion and have high strength. Carbon fibers having filament diameter of 7.5 $\mu$m ($10^{-6}$) typically have tensile strength of 1750 MN/m$^2$, in contrast to the tensile strength of mild steel of between 300 to 900 MN/m$^2$. When the heating members used are comprised of carbon fibers, the resultant reinforcing properties may be equal or superior to that of steel reinforcement.

In the construction of a wall element, such as in tilt-up construction, the carbon fibers are presented in the form of a three dimensional profile impregnated with polymer resin matrix compatible with the alkaline concrete environment and capable of rigidifying with the addition of the heat produced in the curing operation disclosed. The initial pliability of the members allows for quick and easy distribution within the forming mold. The heating members are arranged in a continuous sequence or are individually placed throughout the structure.

In one embodiment of the invention, external conductive contact members are removably attached to the internal surfaces of the forming mold at selected locations before the heating members are positioned and the concrete is poured. These contact members serve as connection points for the pliable members as they are arranged in the structure to ensure correct positioning and to communicate electrical energy from an external power supply to the heating members. Other forms of connection can be used, depending on the geometry of the structure, including continuous buss bars and a roller system positioned outside of the form walls that the accumulate the pliable heating members and provide tension to ensure that the heating stratum remains positioned during the concrete pour.

The heating members discussed can also be provided in a rigidified form. In this scenario, the members can be handled in the same manner as traditional steel reinforcing materials. Opposing ends of the rigid members are allowed to protrude through the form walls for similar communication to the external electrical power source or are connected to the contact members in a similar configuration described. The heating members are strategically located to provide a consistent heat profile through the thickness of the structure and have a substantial surface area affording adequate contact with the surrounding concrete wherein the thermal energy produced is conducted directly into the surrounding concrete.

By introducing heat to a concrete structure using the aforementioned process, curing cycles can be reduced by as much as 66%. The design of the heating members is flexible in that carbon fiber content, polymer content and profile geometry can be calculated and modified to provide a specific surface area, meet specific cost and electrical requirements and supply the necessary strength and rigidity to the structure. For example, by introducing heat to the medial portion of a concrete wall panel or structure using the above described invention, thermal energy is efficiently transferred to the concrete without any loss to the atmosphere resulting in faster cure cycles and reduced energy requirements translating to increased productivity and cost savings. A synergistic benefit of the invention is the ability to minimize or obviate the need for reinforcing steel by employing the structural properties of the heating members again relieving installation costs and affording a degree of flexibility in design.

These and other novel features and advantages of the present invention will be apparent from the following description of the embodiments with reference to the accompanying drawings. Other benefits of the invention will also become apparent to those skilled in the art and such advantages and benefits are included within the scope of this invention.

BRIEF DESCRIPTION OF THE DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 2C is a table of Carbon Fiber Heating Properties.

FIG. 4A illustrates existing practices of placement of rebar within a cement beam.

FIG. 4B illustrates typical or simple application of forming a pre-stressed concrete beam.

FIG. 9A illustrates a cross sectional view along the axis AA illustrated in FIG. 9.

FIGS. 11C and 11D illustrates another embodiment of the invention along the axis A-A in FIG. 11A.

DETAILED DESCRIPTION OF THE INVENTION

The above general description and the following detailed description are merely illustrative of the subject invention and additional modes, advantages and particulars of this invention will be readily suggested to those skilled in the art without departing from the spirit and scope of the invention. The invention generally provides a means for heating concrete structures employing electrically conductive resistive heating components comprising carbon (also described herein as "fiber circuits", "heating components" or "heating members") embedded within the concrete structure to provide impedance or resistive heat from an AC or DC current source (hereinafter "resistive heating") and remaining permanently intact as structural reinforcement. The heating component can be electrically energized and may include one or more electrically conductive contact members or connections (also termed "contact members") for connection to an electrical power source. The invention also pertains to concrete structures containing such components.

Figure 1:
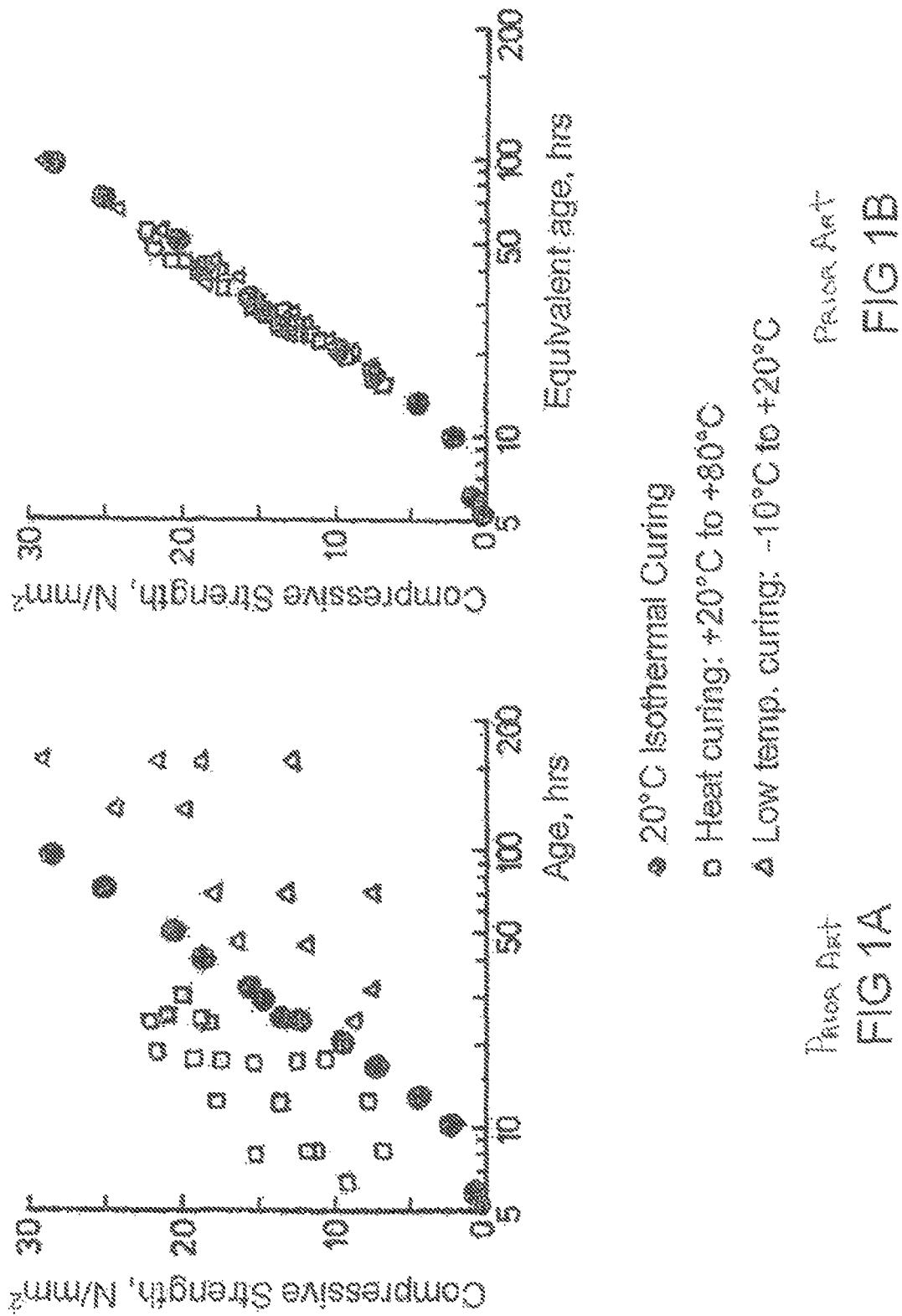
FIGS. 1A and 1B illustrate reported results of compressive strength data at various temperatures at actual ages and equivalent ages.
Figure 2:
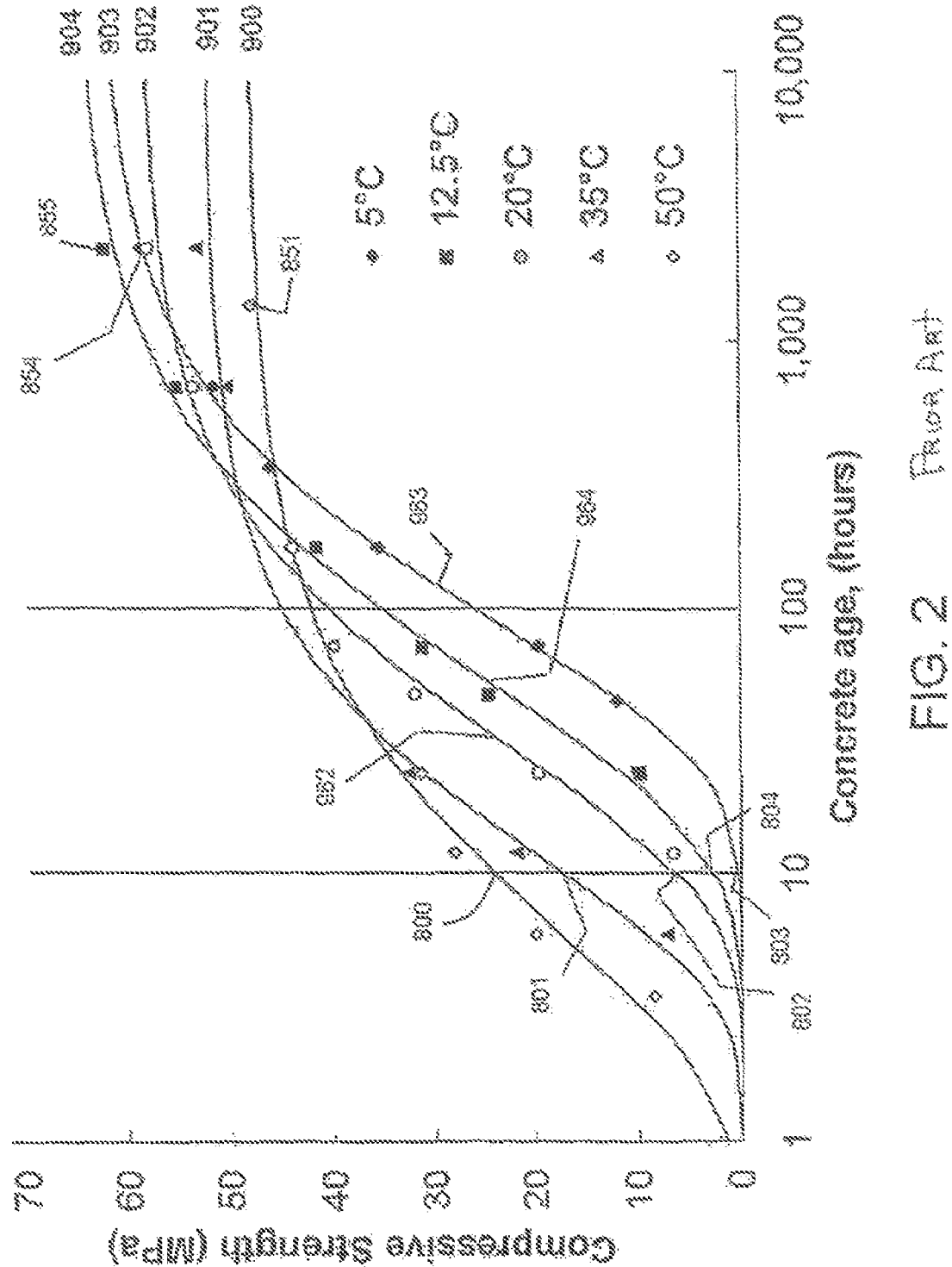
FIG. 2 illustrates reported results of compressive strength of mortar cured at different temperatures.

FIGS. 1A, 1B and 2 illustrate data published by Anton Schindler as referenced above. FIG. 1A illustrates the measured compressive strength for a concrete mixture cured at three separate temperatures. As may be expected, the heated cure mixture (20° C. to 80° C.) exhibits significant compressive strength after 10 hours and achieves maximum compressive strength within 30 hours. The mixture kept at low temperature (−10° C. to +20° C.) did not exhibit compressive strength until after 20 hours and achieved maximum strength after approximately 150 hours. Interestingly, the highest compressive strengths were achieved by samples cured at 20° C. and at low temperatures (−10° C. to +20° C.). This is illustrated also in FIG. 1B after the cure time is normalized.

FIG. 2 depicts test results consistent with the information disclosed in FIGS. 1A and 1B. After 10 hours, the sample 900 curing at 50° C. (122° F.) is shown to achieve a compressive strength 800 of approximately 25 MPa (or approximately 50+% of the total strength achieved). The sample 901 curing at 35° C. (95° F.) achieves a strength 801 of approximately 17-18 MPa. After 10 hours, the sample 904 curing a 12.5° C. (54.5° F.) has achieved a measured compressive strength 802 of approximately 4 MPa (or less than 10% of the ultimate strength) and the sample 903 curing at 5° C. (41° F.) has achieved negligible 803 compressive strength. It will be appreciated that FIG. 2 shows the rate of gain in compressive strength reaches the maximum for the 50° C. sample at approximately 10 hours. This is particularly noteworthy in view maximum compressive strength achieved by this sample is the smallest 851 of all samples. The greatest measured compressive strength 855 is achieved by the sample 904. Sample 903 and sample 902 curing at 20° C. (68° F.) achieve near equal measured values 854 of compressive strength.

Further, the data illustrated in FIG. 2 indicates the maximum rate of strength gain 963 is not achieved by 5° C. sample 903 until after 100 hours. The 20° C. sample 902 achieves the maximum rate of strength gain 962 after approximately 65 to 70 hours. The 12.5° C. sample 904 achieves the maximum rate of strength gain 964 after approximately 80 to 90 hours.

Therefore the invention subject of this specification includes heating the concrete at the initiation of the curing to achieve a high rate of strength gain, but then allowing the concrete to cool such that the near maximum rate of strength gain is maintained for each temperature. In a preferred embodiment, the invention includes the ability to vary the heating rate to optimize the control of the concrete temperature during cure.

Figure 2B:
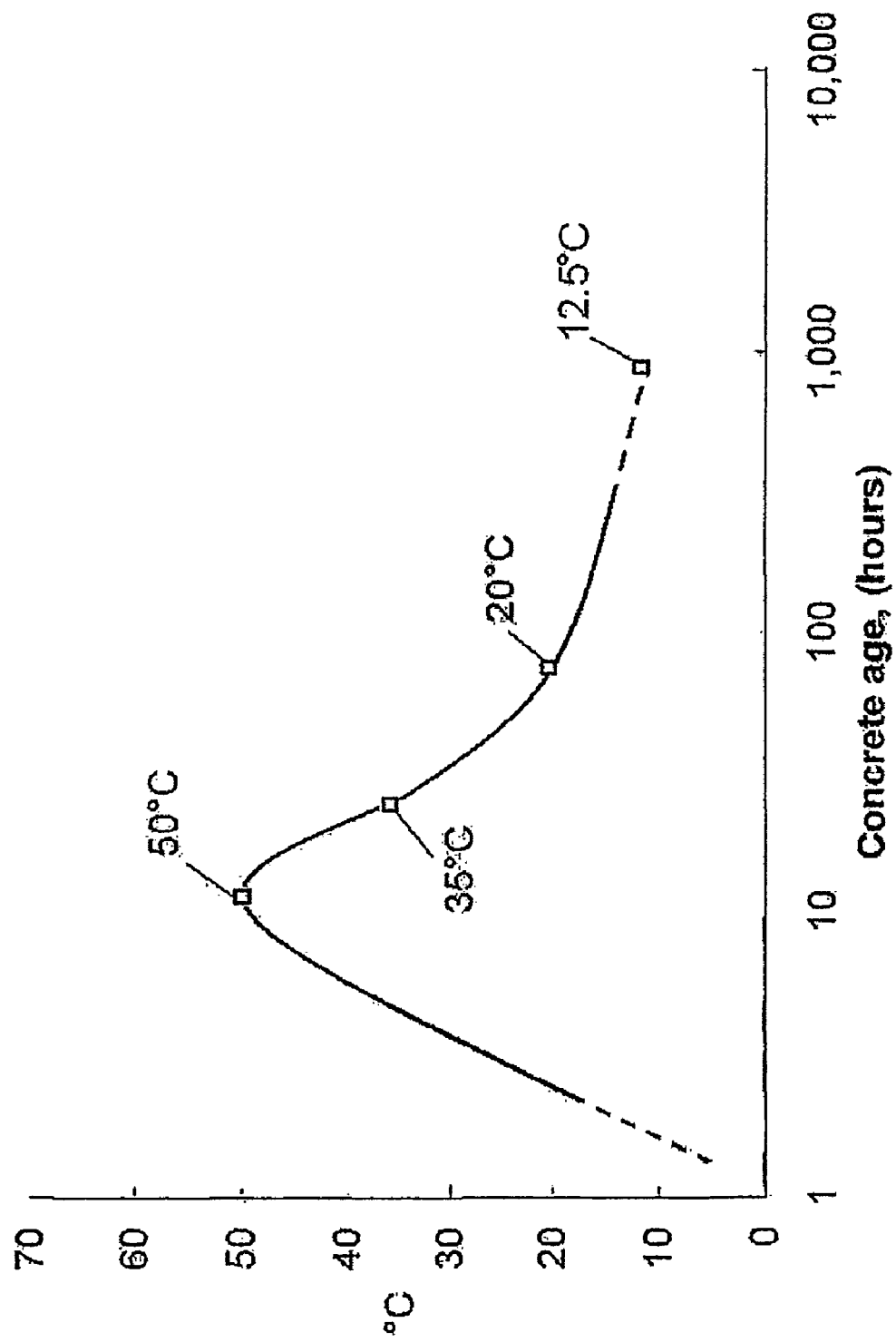
FIG. 2B illustrates a heating schedule taught by one embodiment of the invention.

FIG. 2B illustrates one embodiment of this variable heating of the concrete for controlled optimization of cure rate and ultimate compressive strength. The invention therefore includes creation of "look up" tables for heating rates for cure of differing types or engineered placement of heating fibers.

FIG. 2C contains a heating and power data for various types of commercially available fibers and carbon fiber architectures. The table lists test results using a base line 2 square foot piece of carbon fabric woven from 2P50K fiber, drawing 100 watts per foot, at 5 volts and 20 Amps, and achieving 130° F. in 10 minutes. It will be appreciated by persons skilled in the art that the fibers are classified or gauged by the number of filaments or tows comprising the fiber. Carbon fiber is typically measured in 1000's of filaments, e.g., 6K or 12K.

Figure 2D:
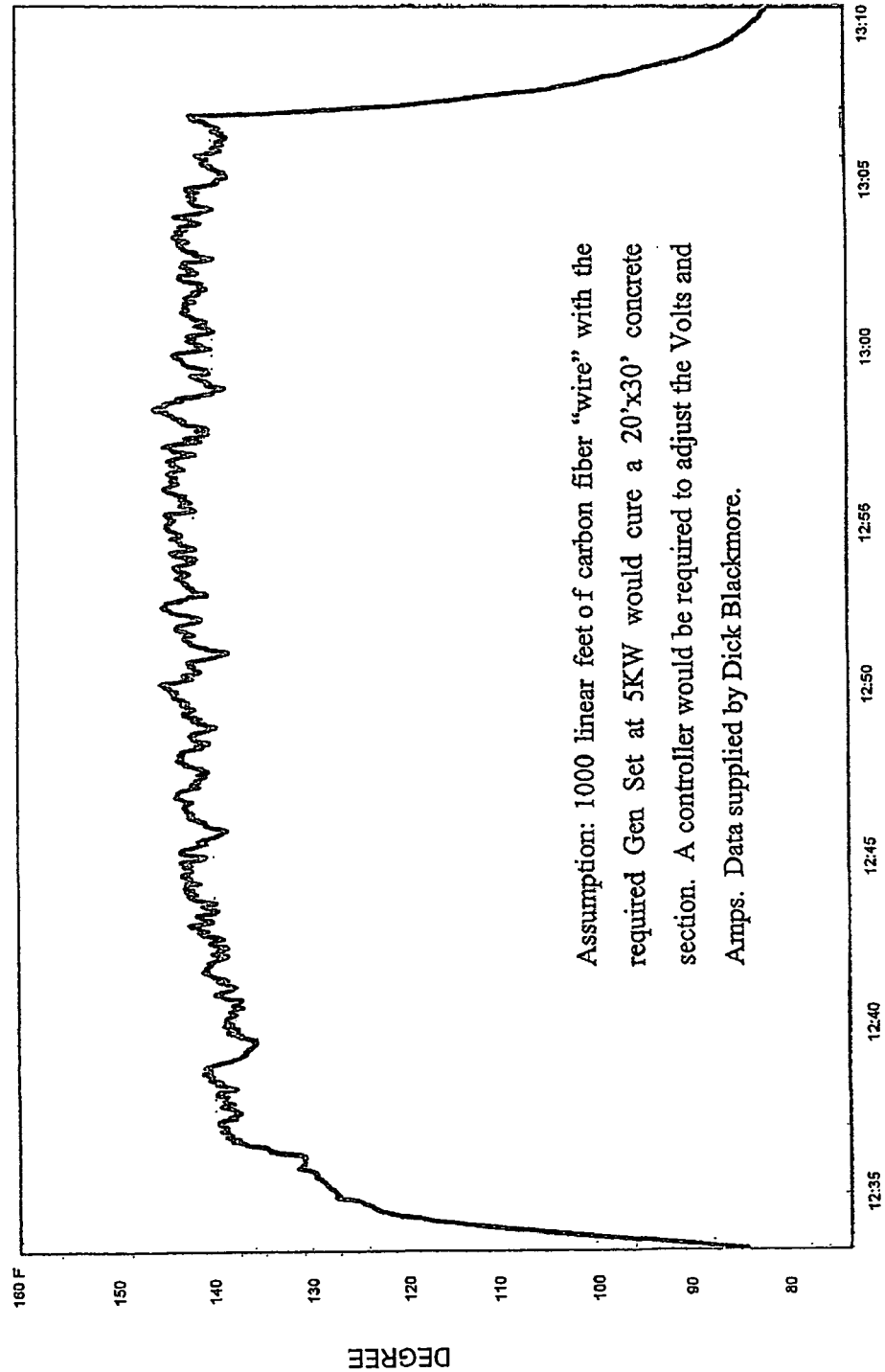
FIG. 2D illustrates the time to temperature of a 1K tow carbon fiber "wire".

FIG. 2D illustrates a graph of time to temperature for a 12K tow carbon fiber wire at a specified power setting. The graph illustrates the ability of a high strength carbon reinforcing material to provide resistive heat. The temperature readings were recorded for an approximate 1000 ft length of carbon circuit, being a length that capable of providing heat to a 20 ft×30 ft×0.25 ft concrete structure.

Figure 3A:
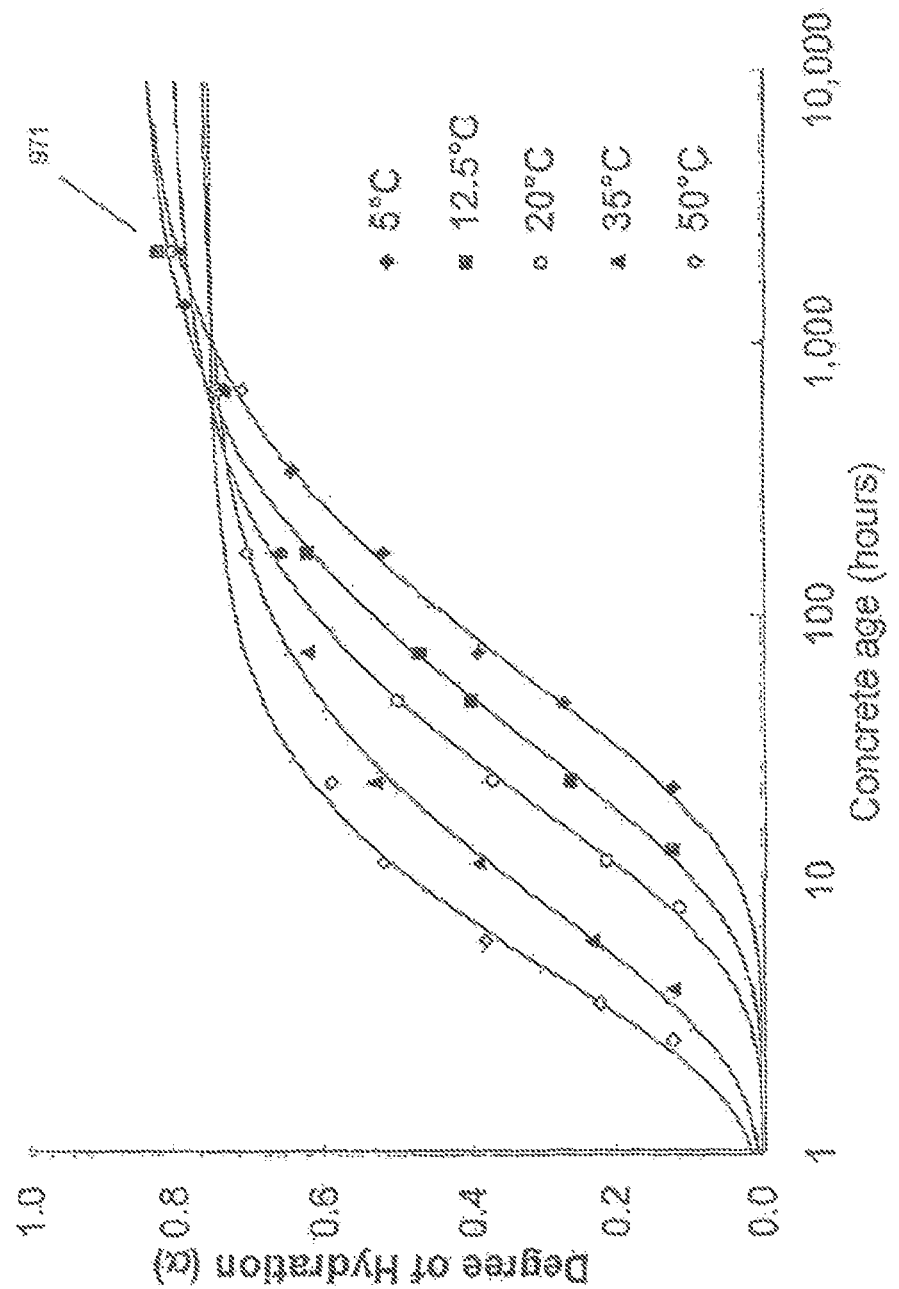
FIGS. 3A, 3B and 3C illustrate reported results for the degree of hydration for concrete mixtures cured at different temperatures.
Figures 3B, 3C:
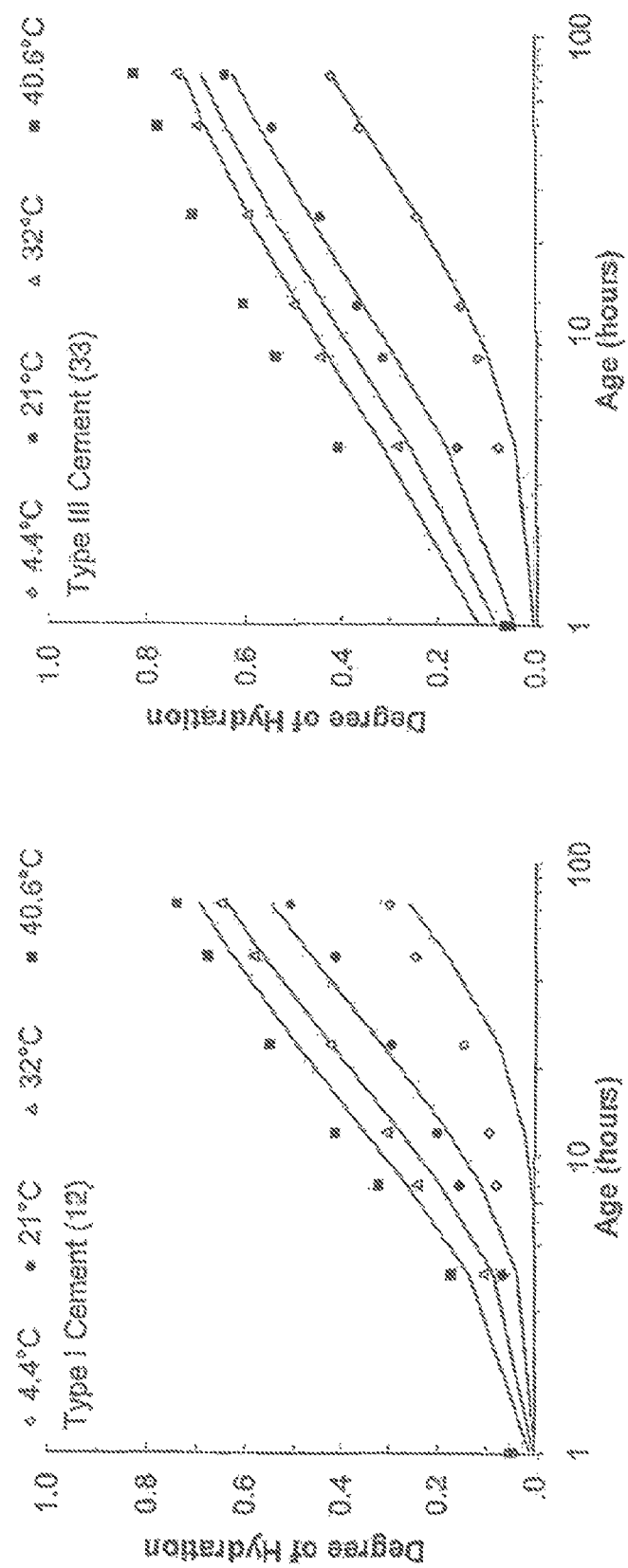

FIG. 3A depicts test data consistent with the data illustrated in FIG. 1C showing that the degree of hydration (curing) is nearly equal 971 regardless of the concrete temperature.

FIG. 4A illustrates the typical simple placement of rebar 210 within a concrete structure 100. The direction of gravitational force experienced by the beam is illustrated by the vector arrow 950. An external load in the center section of the structure will place the upper portion 112 of the structure in compression and the lower portion 114 in tension, as shown by vector arrow 955. Steel bars help to sustain the tensile stress. FIG. 4B illustrates a pre-stressed concrete structure 100. Steel wires 211 in tension exert a compressive force (vector arrow 970) on the concrete within the lower portion 114. This compressive force offsets the expansive tension illustrated in FIG. 4A by vector arrow 955. The compressive force is place at each end of the structure 116 117, utilizing the attachments 212 to the tensioned steel wire.

Figure 5:
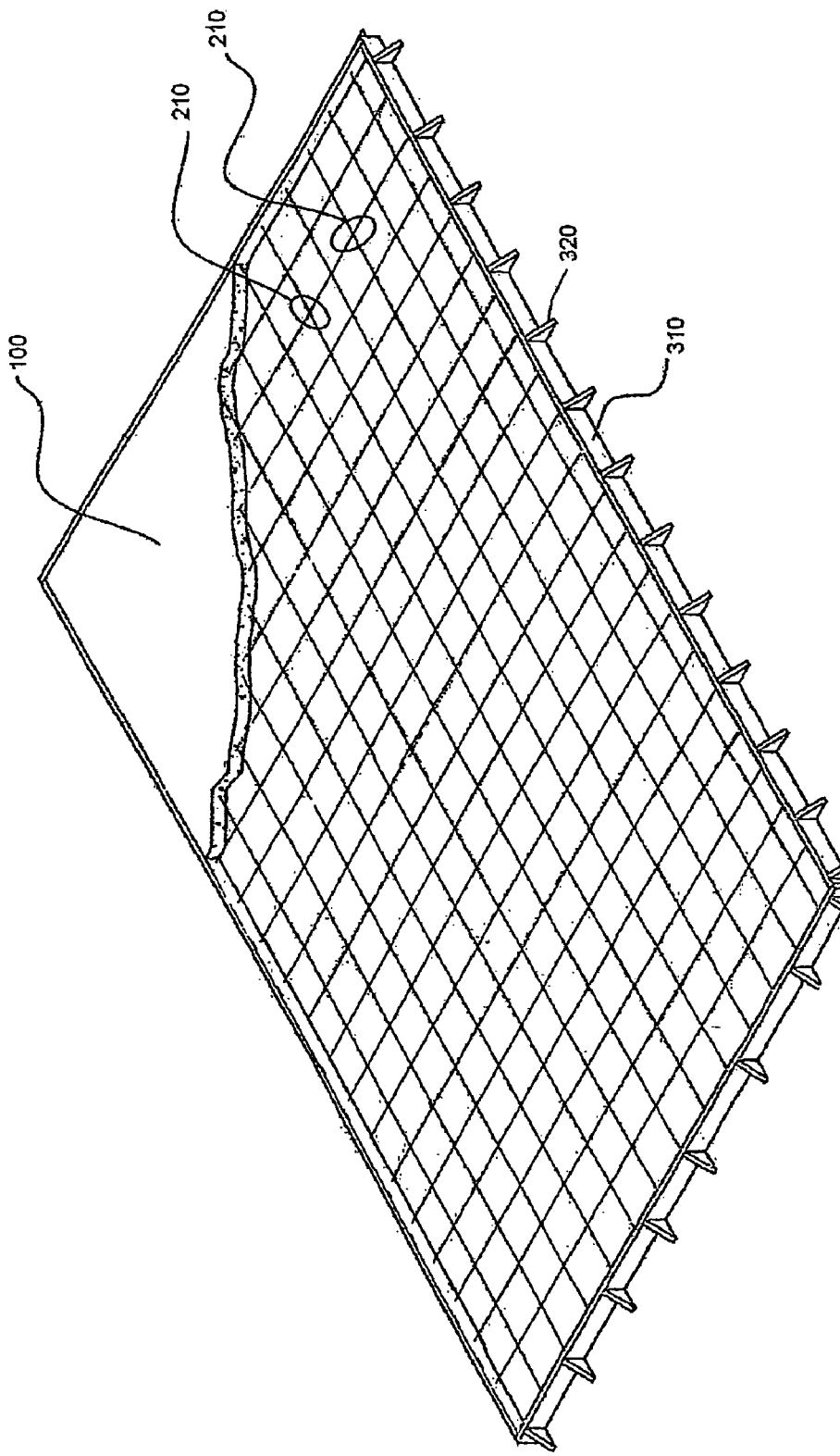
FIG. 5 is an isometric view of a typical tilt-wall forming arrangement depicting the perimeter forming members and the traditional steel reinforcing members in place.

FIG. 5 depicts a typical concrete forming arrangement used in tilt-up wall construction. Concrete 100 is shown partially filled within a panel forming arrangement defined by perimeter forms 310. Support blocks 320 are situated to provide lateral support to forms 310 and to enable the forms to withstand the forces of pouring concrete without distorting the desired geometry. Steel reinforcing wires 210 are shown in a typical configuration. Because concrete panels built using this construction technique must be afforded sufficient time to reach a less than complete level of cure before tilting into position, additional reinforcing steel must be added to withstand the stresses of tilting.

Concrete construction typically utilizes forms, such as shown in FIG. 5, to maintain the viscous, uncured concrete in the intended shape during setup and hardening. The forms are often then removed. Rebar, as shown in FIG. 4 above, typically is installed in the desired location within the forms prior to the pouring of the uncured concrete. Due to the high density and viscosity of concrete, it is necessary that the forms and the rebar have sufficient strength to maintain the intended placement. The fiber circuits subject of this invention may also be installed prior to the concrete pour. Although the fibers may be of carbon or other high strength material, it is necessary that the movement of the concrete during the pour not displace the circuit. It will be appreciated that the fiber circuits may be secured to the forms, rebar or other component. This can be accomplished by winding or similar methods. In some applications, it may be desired that the circuits be placed in a tensioned framework in order that the spacing of the circuits, and therefore the engineered heat dispersion, not be altered. This method may be akin to the installation of steel reinforcement in prestressed concrete. The engineering and design of the circuit installation may also incorporate the placement of the electrical power connection components.

Figure 6:
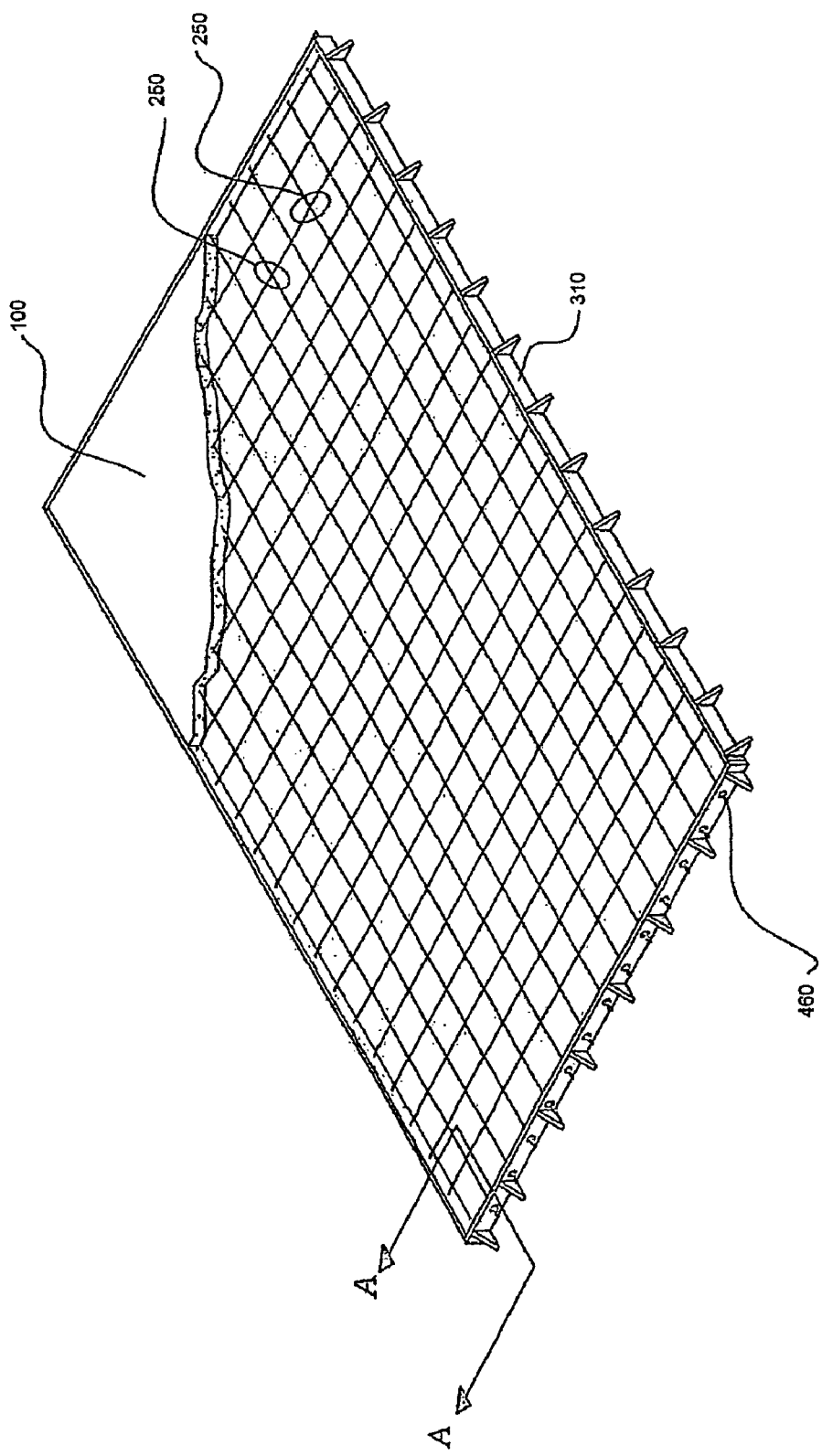
FIG. 6 is an isometric view of a tilt-wall forming arrangement depicting the use of the heating members described in the invention and a connection method—for communicating electrical power from a power supply to the heating members.

In FIG. 6, a concrete wall forming arrangement is shown with heating members (fiber circuits) 250 replacing the steel reinforcements shown in FIG. 5. The members 250 communicate with electrical contacts 460 penetrating through forms 310 to allow connection with a power supply (not shown). Based on the actual tensile properties needed in the finished structure, heating members are designed to provide the structural reinforcement as well.

Figure 7:
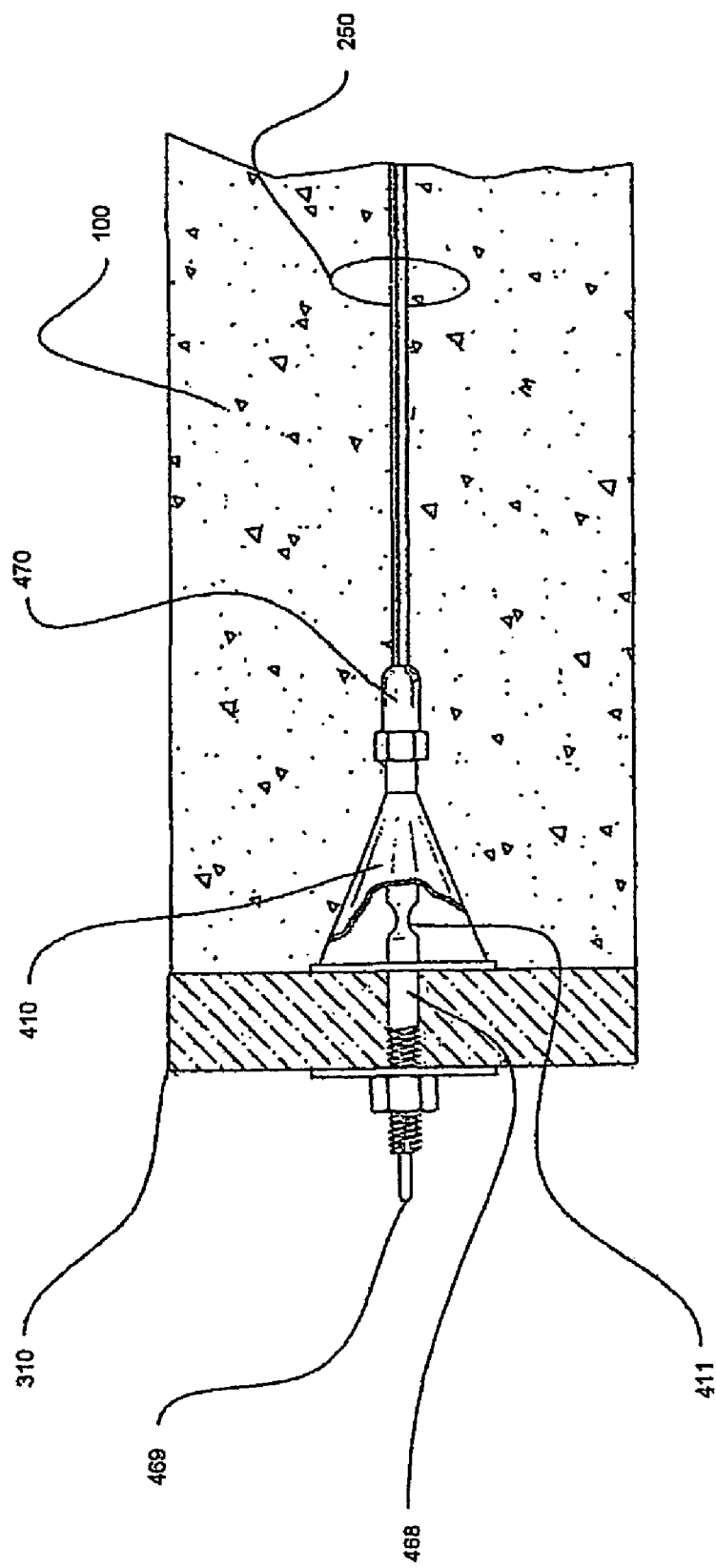
FIG. 7 is an enlarged cross-sectional view of a forming wall and a removably attached electrical connection.
Figure 8:
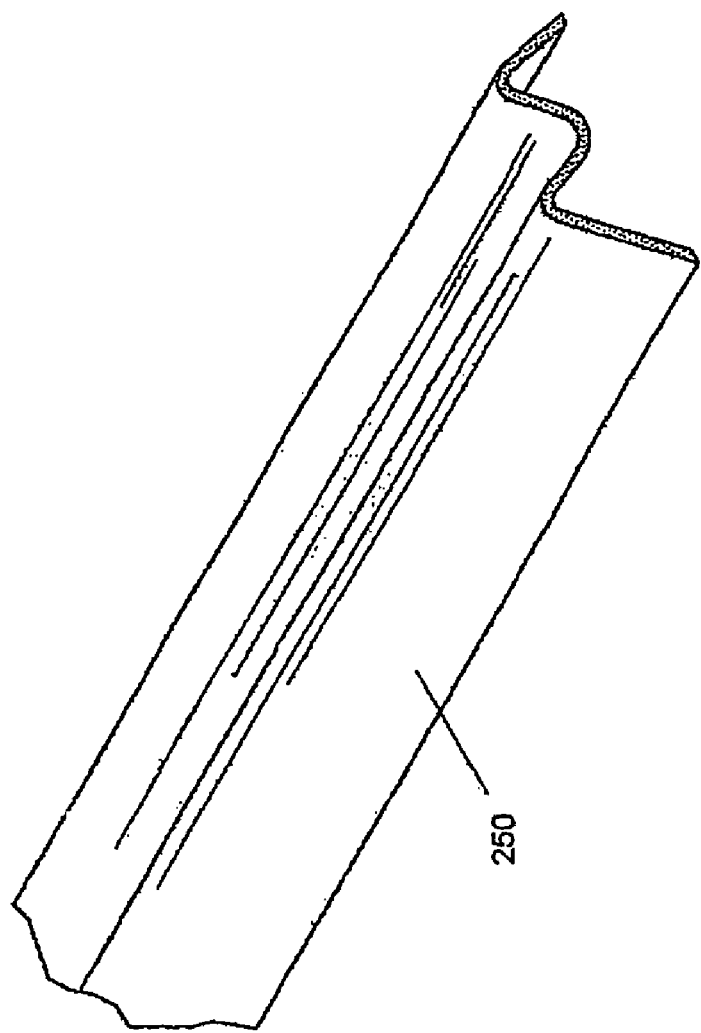
FIG. 8 is a cross-sectional view of a heating element formed into a three-dimensional profile.

FIGS. 6 and 7 portray the heating element 250 as a wire or fiber that can be conveniently spooled and easily handled on site. In this embodiment, the heating element 250 is supplied in this cylindrical or rope like profile with other possible embodiments being a 'C' channel, rectangular or any other custom designed shape specific to the site application and requirements. Such an alternate arrangement is shown in FIG. 8. The heating element 250 may comprise a plurality of high strength electrically conductive fibers (e.g., carbon fibers or filaments) that may be impregnated with a resin matrix capable of rigidifying with the application of heat. A suitable resin matrix is Dion 6694 vinyl ester combined with RD 1070 thickening agent from Reichhold Chemicals. In order to provide extended shelf life, a latent initiator package is used that allows 30 days of shelf life at cool, storage temperatures. A catalyst package consummate with this objective is a 1% concentration by weight of both Trigonox 29-B75 and Trigonox 21 available: from Axzo Nobel. Resin impregnation takes place off site and the heating members are shipped to the installation site. The conductive components members subject of this invention are variously described as electrically conductive fibers or fiber circuits. It will be appreciated that this term includes elongated materials, including but not limited to wires, rods, fibers, filaments, chopped fibers, coiled or crimped fibers.

In another embodiment, the heating member 250 is impregnated with a thermoplastic resin matrix or commingled with thermoplastic fibers. This arrangement affords unlimited shelf life and remains pliable until the heat generated during concrete cure process sets the thermoplastic resin or fiber combination. Once cooled, the heating member rigidifies providing structural reinforcement in the finished concrete structure 110. In yet another embodiment, the heating members are supplied in a previously rigidified form. Here the members are handled much like traditional reinforcing steel (rebar) with the exception of providing a means to communicate electrical energy to the members. Rigidification in this embodiment can be the result of either a thermoset or thermoplastic resin matrix combined with the carbon fibers.

FIG. 7 demonstrates a cross sectional view of on embodiment of an electrical connection as seen in FIG. 6 along lines A-A. In this view, the electrical contact 460 assembly comprising a gripping apparatus 470 for the carbon fiber heating member 250. This interface conveys electrical energy from an external power supply (not shown) through contact 469. This member has an externally threaded portion to accept a fastener. The fastener rod 468 has a thinned section 411 where, after the concrete is cured and forms stripped, the rod can be easily snapped off and removed within the conical area formed by the recess forming shoe 410. In a typical wall forming operation, forms 310 are assembled to define the perimeter of the structure 100. The heating fiber circuit 250, which are an object of this invention, are arranged within the cavity defined by the forms.

Figure 9:
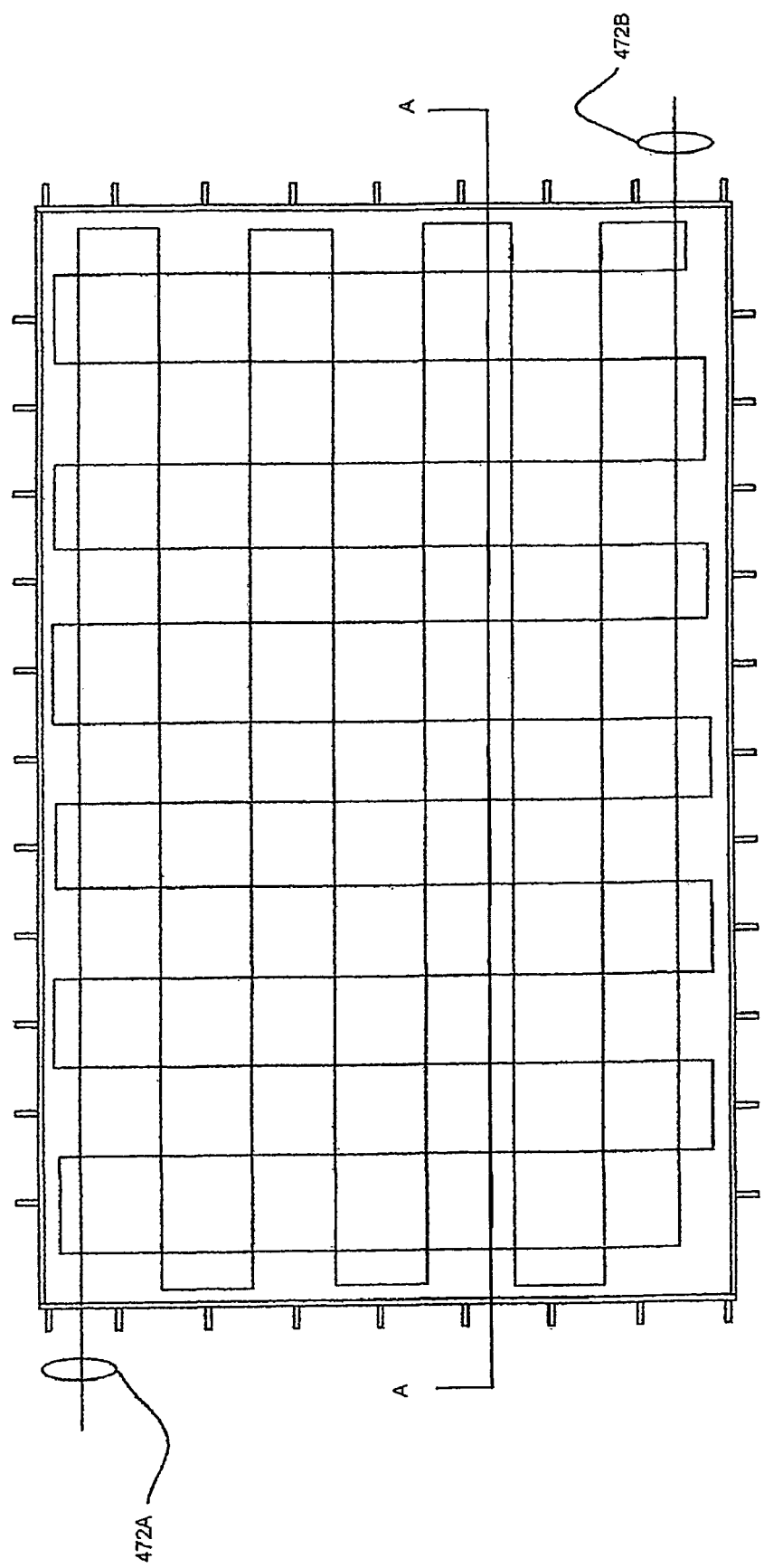
FIG. 9 is a plan view of a typical heating member arrangement depicting the heating members in a continuous circuit.

FIG. 9 shows one such arrangement. The arrangement is dictated by the amount of heat energy necessary to expedite the curing process as well as by the finished mechanical properties of the wall. Because a wall section cured using the method described will attain a higher degree of cure in a shorter time frame, the actual reinforcing requirements for fitting the wall into position can be reduced. In FIG. 9, the heating members (fiber circuit) are arranged in a continuous fashion wherein electrical contact is only required in two locations 472A and 472B. This embodiment also facilitates the simultaneous curing of several wall panels or structures by connecting the panels in series or parallel circuits. FIG. 9A is a cross sectional illustration along the axis A-A of the structure in FIG. 9. FIG. 9A illustrates the orientation of the multi-layered fiber reinforcing circuit 250 within the section. Also illustrated are the section form components 310 320 and the relationship of the concrete section to the ground 199 during cure.

Figure 10A:
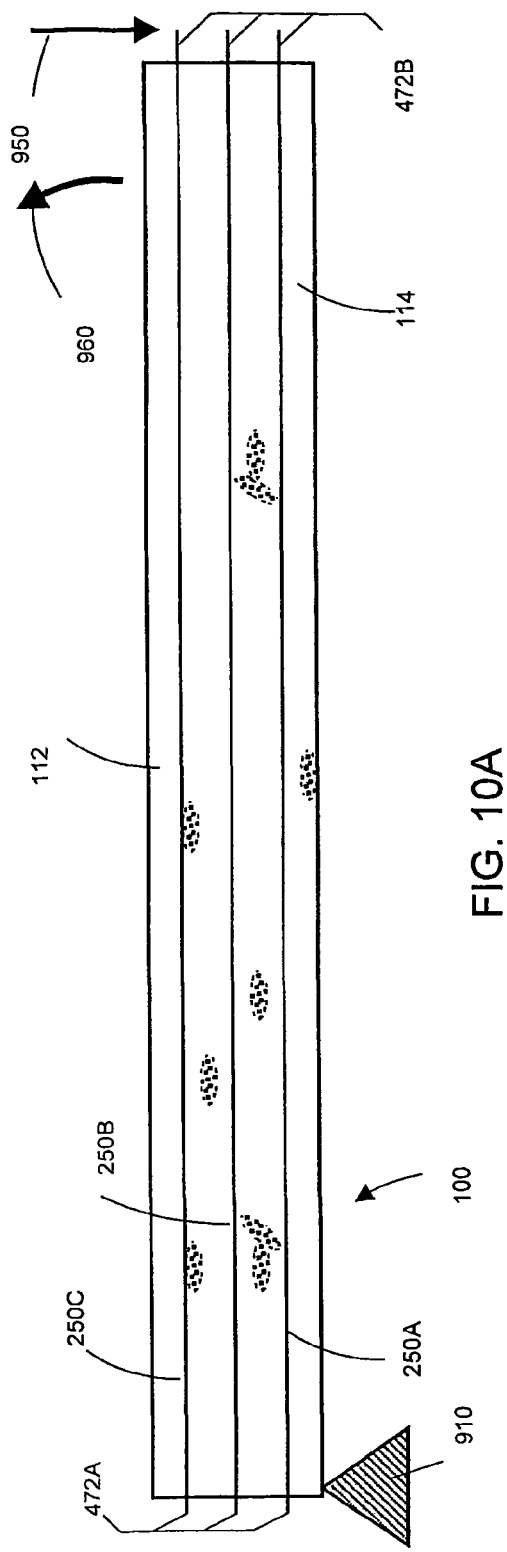
FIG. 10A illustrates a side perspective to a concrete tilt wall structure utilizing fibers as taught be the invention.

FIG. 10A illustrates a cross sectional view of another embodiment wherein multiple circuits 250A 250B 250C are installed within a concrete section 100. The circuits are placed at varying depths and may have differing directional orientation. The orientation and composition of the circuits can be engineered to create greater reinforcement at the lower portion 114 of the structure that at the upper level 112. The orientation will be beneficial as the structure is raised from one end, represented by vector arrow 960 using the opposing end as a fulcrum 910.

Figure 10B:
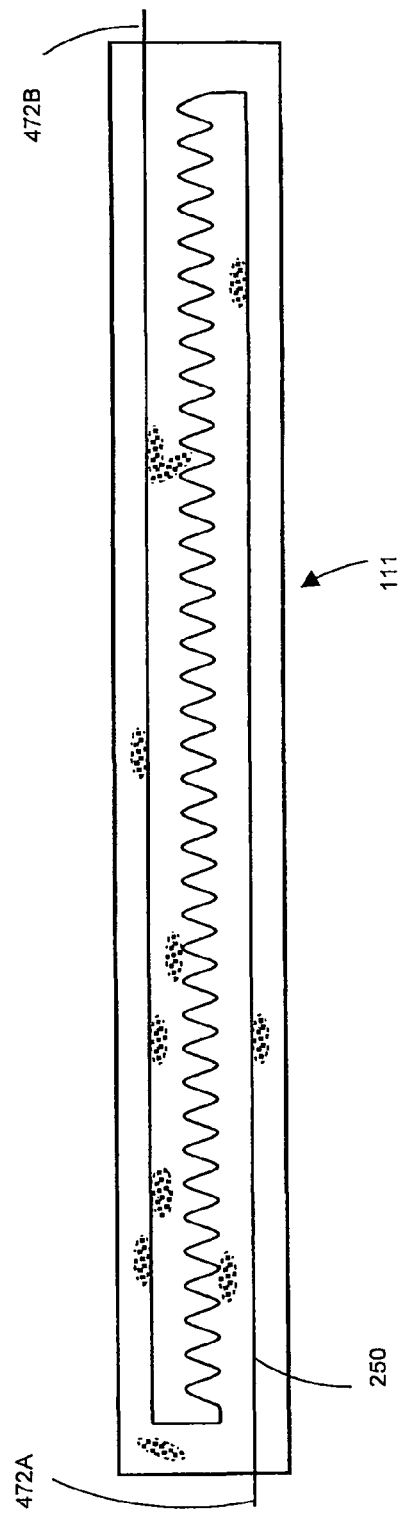
FIG. 10B illustrates a side perspective of another embodiment of the invention utilizing a differing fiber orientation.

FIG. 10B illustrates a single fiber reinforcement circuit path 250 of the invention wherein the orientation of the fibers is enhanced in a third direction through the thickness of the structure 111. The fibrous composite circuits can, of course, be oriented in conjunction with other fiber reinforcing material not energized to furnish heat for the curing process.

Figure 11A:
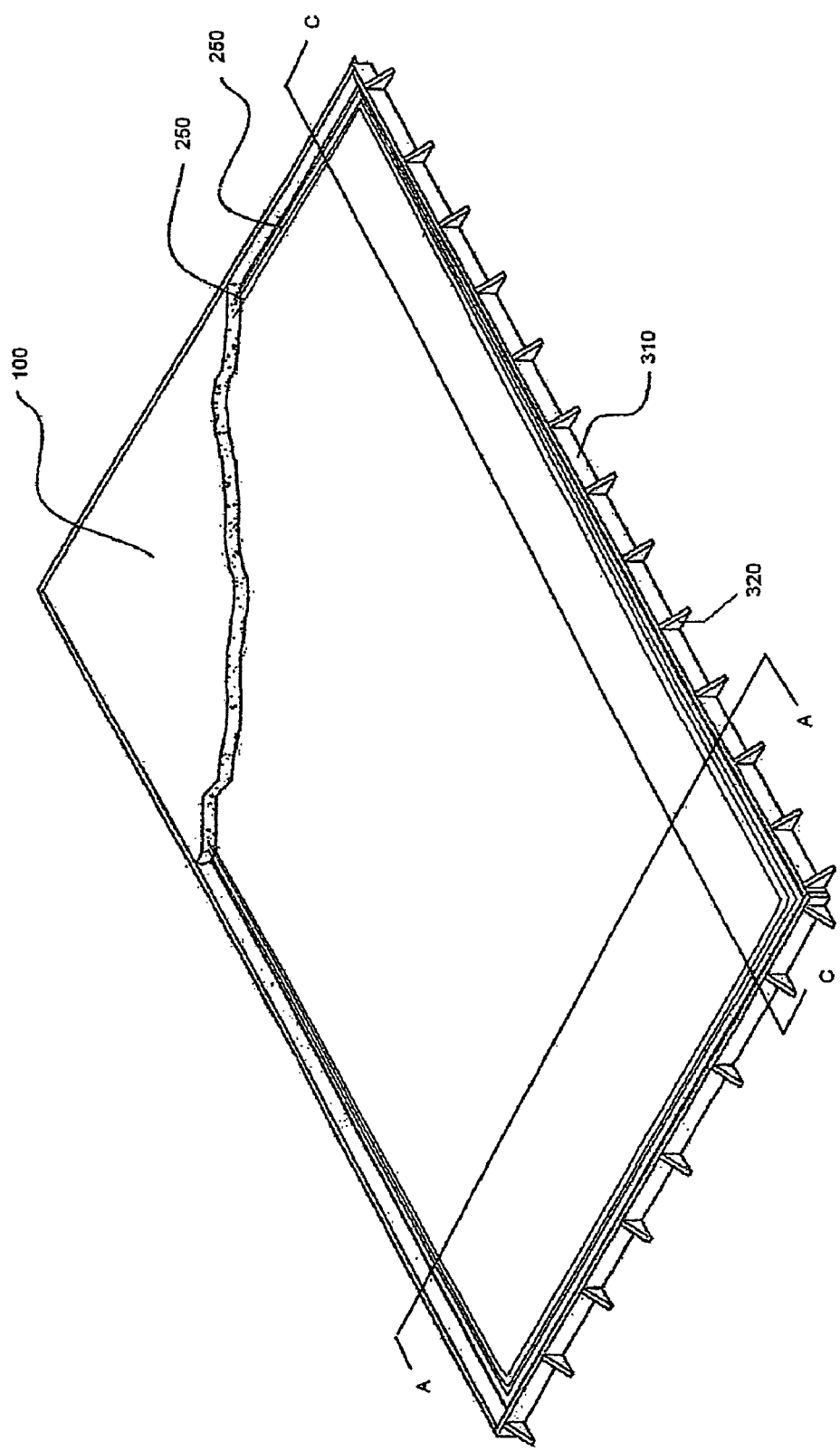
FIG. 11A illustrates a perspective of an embodiment of the invention wherein the fibers are oriented substantially in at region proximate to the outer edge.

It may be desirable to selectively heat portions of the uncured concrete in order to achieve rapid setup and hardening, while allowing other portions of the uncured concrete to more slowly cure (and thereby possibly achieve higher ultimate compressive strength. FIG. 11A illustrates a concrete structure wherein one or more electrically conductive fiber circuits 250 are installed proximate to the outer perimeter of the form 310. This circuit permits the concrete 100 to be heated after pouring, thereby expediting the setting of the concrete proximate to the forms. The setting of the concrete along the perimeter will permit the forms 310 320 to be removed and reused more rapidly than would otherwise be possible. The remaining concrete can proceed through a slower cure cycle.

Figure 11B:
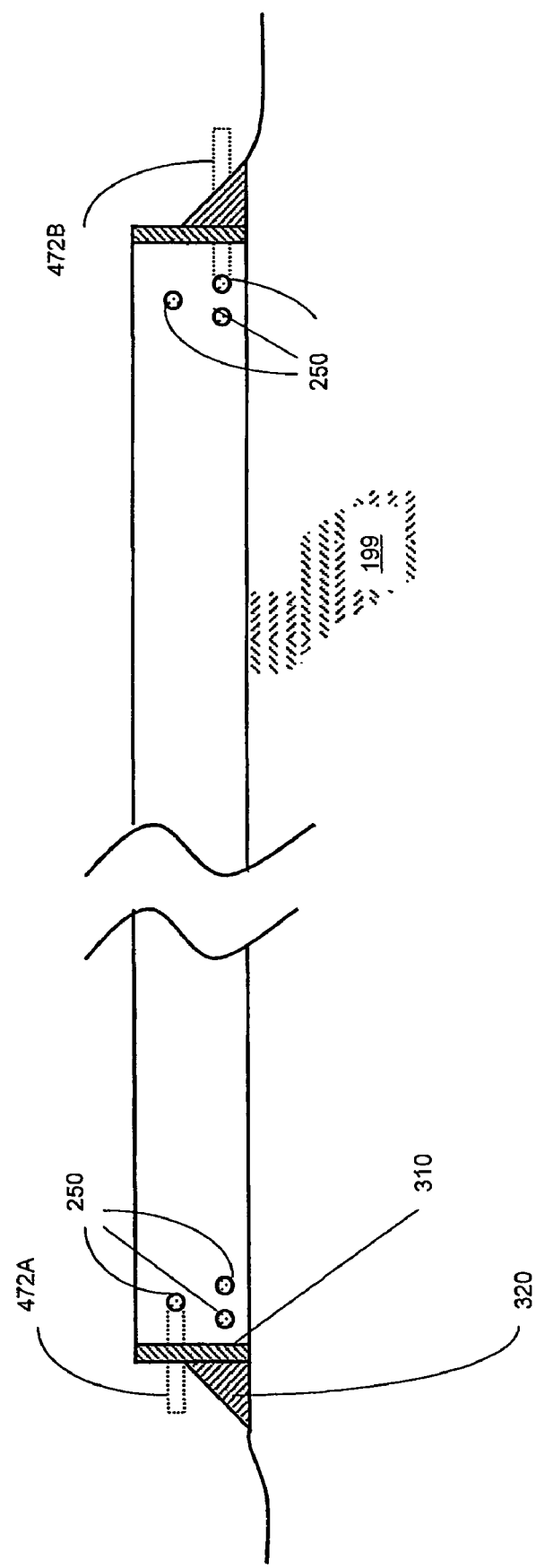
FIG. 11B illustrates a cross sectional view along the axis A-A illustrated in FIG. 11A.

FIG. 11B illustrates a cross sectional view along axis A-A shown in FIG. 11A of the fiber circuits installed adjacent to the perimeter of the concrete structure adjacent to the forms 310 320. Electrical power can be supplied to the circuit by means of connector components 472A 472B.

It will be appreciated that the carbon fiber braid is electrically conductive and readily disperses heat. Since concrete has low thermal conductivity, it may be desirable to improve the dispersion of heat within the concrete (forming the matrix surrounding the carbon fiber braid) by increasing the dispersion (and therefore the number) of electrically conductive carbon fibers creating circuits within the concrete. The greater dispersion of heating circuits will facilitate a more uniform temperature within the concrete.

Accordingly, FIG. 11C illustrates a cross sectional view of a concrete structure containing an increased number of separate fiber circuits 250. The circuits are intended to be relatively uniformly dispersed within the concrete matrix 100. Unlike prior art placement of reinforcing rebar, the fiber circuits are placed both within the upper 112 and lower 114 portions of the concrete structure and proximate to the forms 310. The fibers may be tensioned between the forms 310 component or by similar means in order that the fibers not be displaced during the concrete pour. It will be appreciated that concrete is a dense and relatively viscous material. In another embodiment, the fibers may be affixed to the rebar to provide rapid installation and minimized deformation during the concrete pour. This is embodiment is discussed further in conjunction with FIGS. 13 and 13A.

FIG. 11D illustrates an embodiment of the invention wherein the electrical conductive components (fiber circuit) 250 are used in conjunction with rebar 210. The rebar is located within the lower portion 114 of the structure. The fiber circuits 250 are located relatively uniformly through out the matrix 100.

FIG. 11D also illustrates use of carbon or similar heat conductive fibers within the concrete matrix 105 similar to the teaching of U.S. Pat. Nos. 5,308,696 and 5,685,902. The carbon fibers, being thermally conductive, are used in this invention to additionally facilitate the uniform heating of the concrete.

Figure 12:
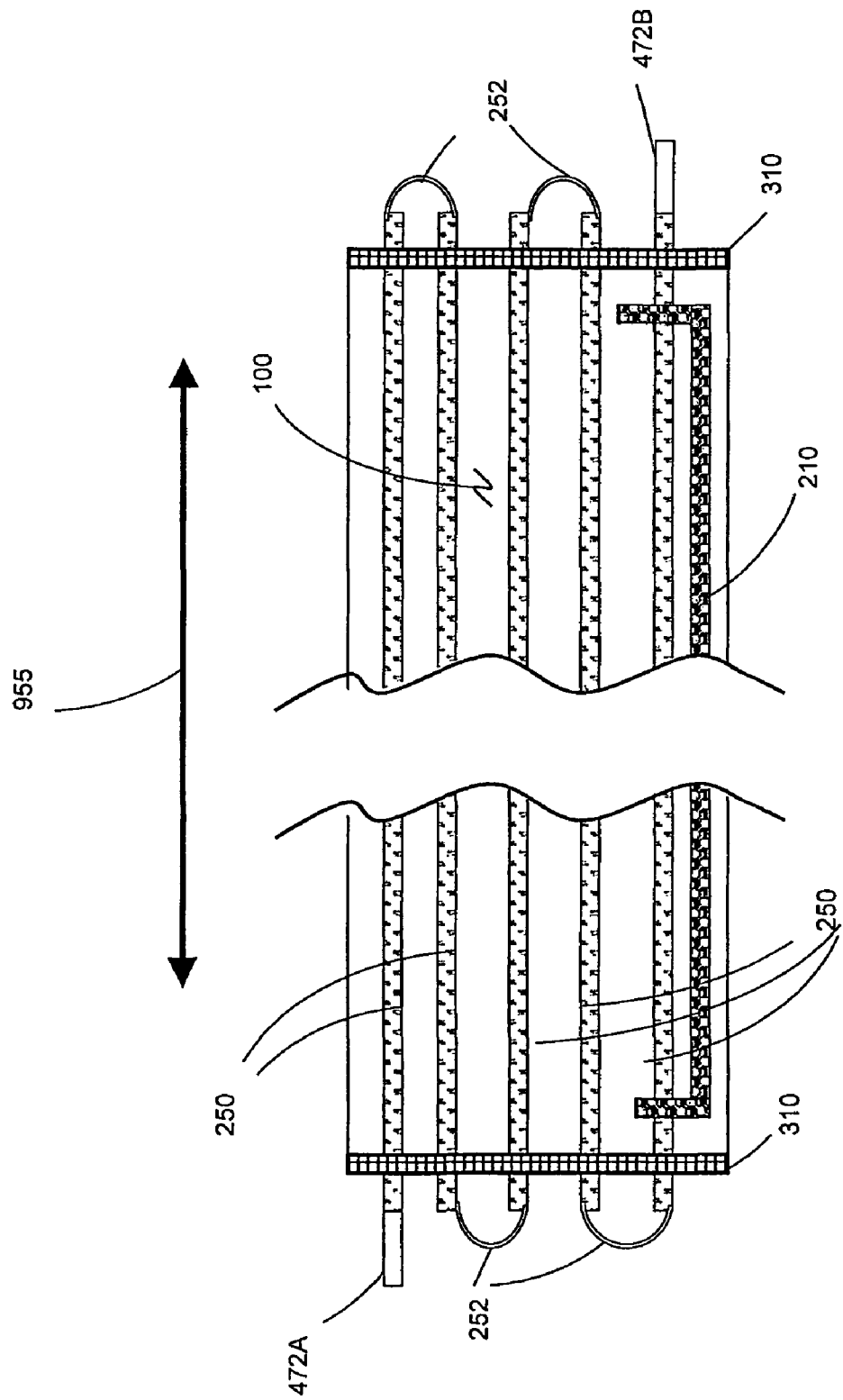
FIG. 12 illustrates the cross sectional view along the axis of C-C in FIG. 11A.

FIG. 12 illustrates a cross sectional view along axis C-C of the structure incorporating the embodiment illustrated in FIG. 11D. The carbon fiber strands 250 within the concrete matrix 100 are interconnected by means of components 252 to form an fiber circuit having connective components 472A 472B which can be utilized with a separate power supply (not shown). Also illustrated is the rebar 210 and concrete forming component 310.

Figure 13:
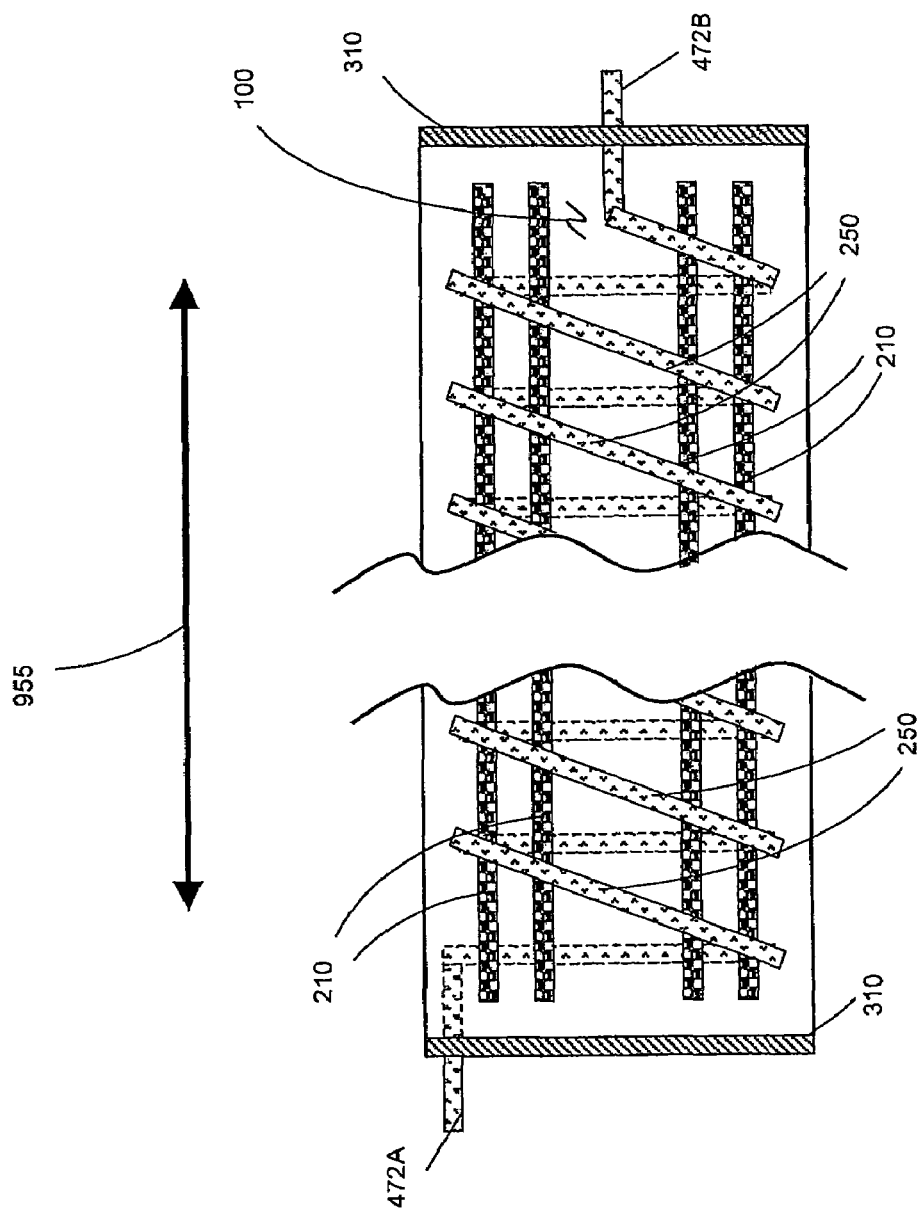
FIGS. 13 and 13A illustrate placement of fiber elements supported by reinforcing rebar.
Figure 13A:
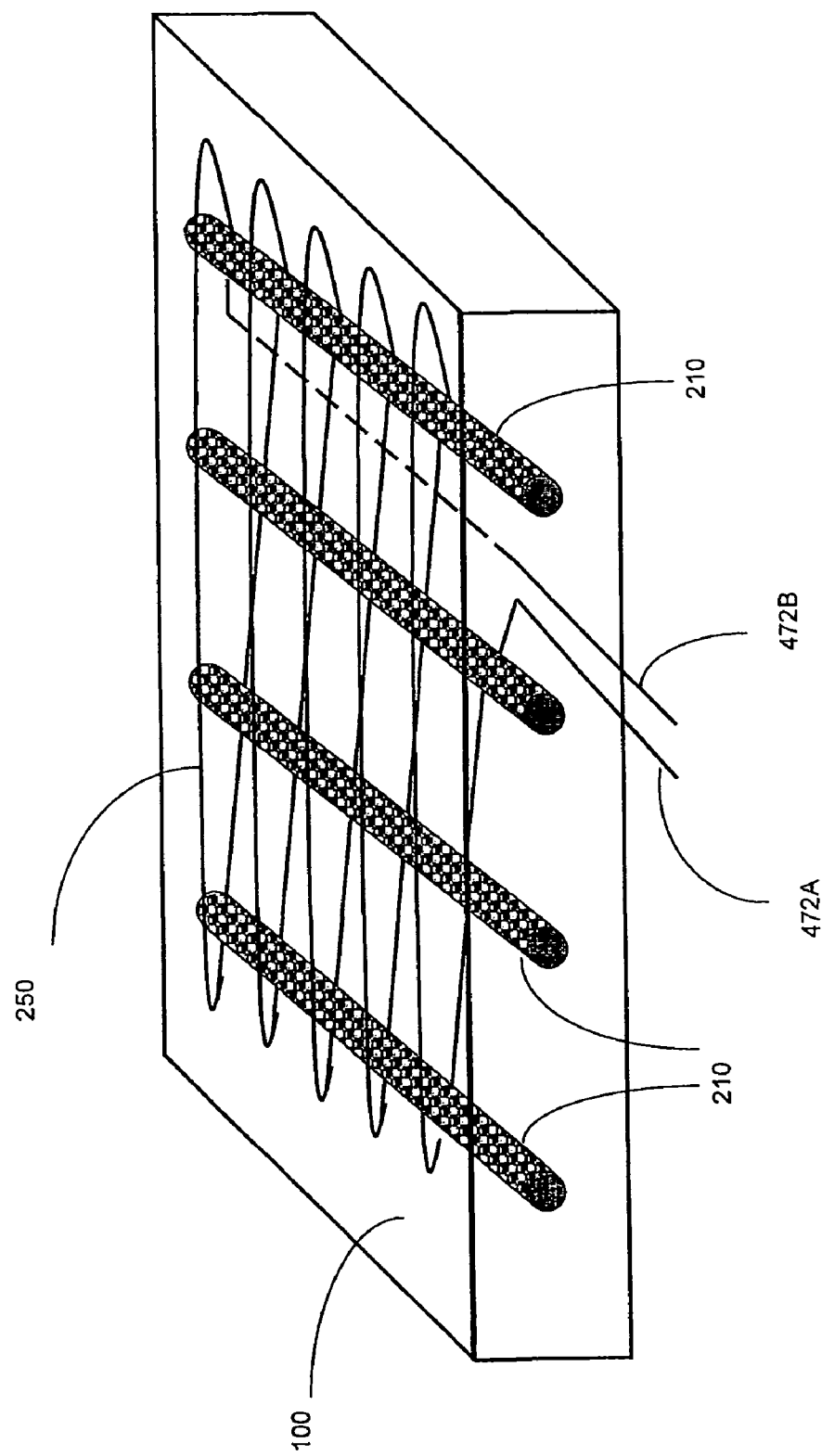

FIG. 13 illustrates wrapping the fiber circuit 250 around the rebar 210. It will be appreciated that the rebar, being made of ferrous metal, is electrically insulated from the electrically conductive fiber. This insulation can be achieved by various means, including use of coated fiber, or placing non conductive spacers between the fiber and rebar (not shown). The use of rebar in this manner has the advantage of readily minimizing the distortion of the fiber placement during the concrete pour.

Figure 14:
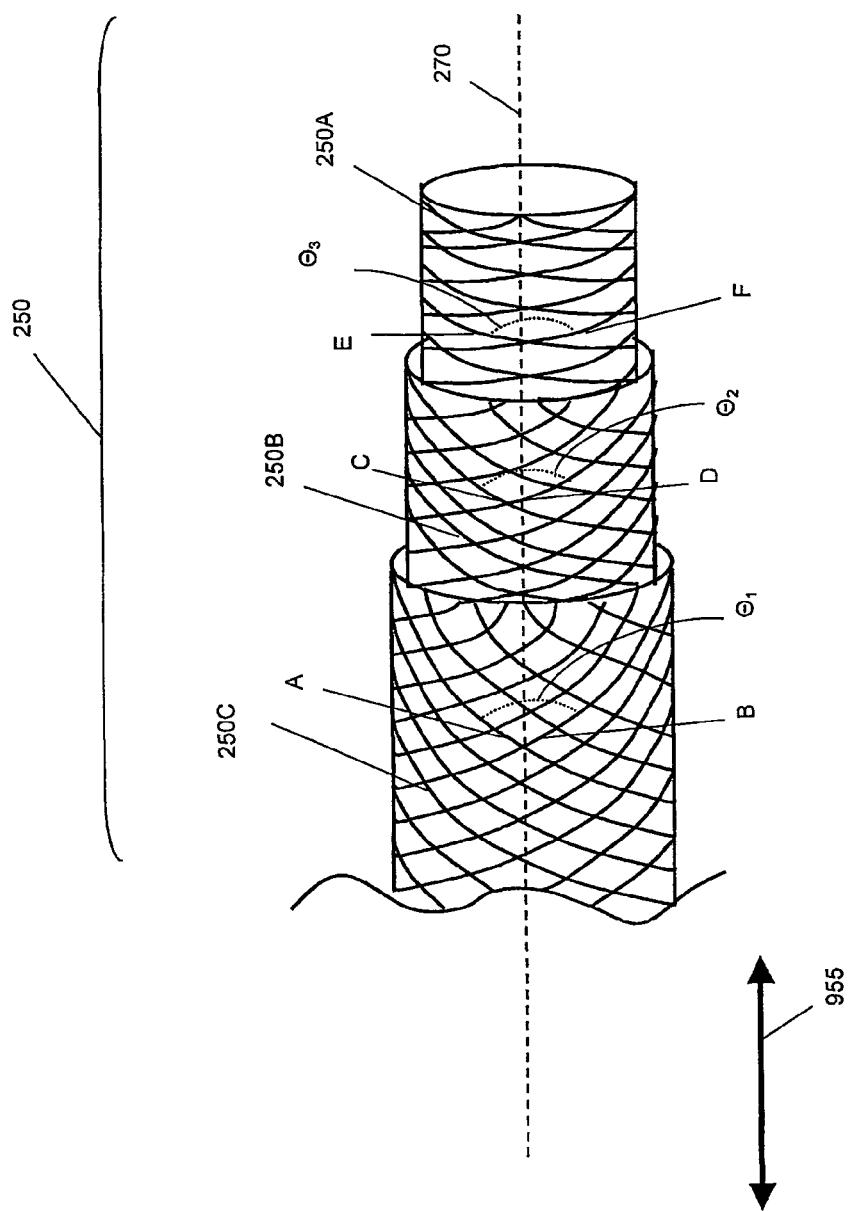
FIG. 14 illustrates a view of a multi-layered braided reinforcing fiber.

FIG. 14 illustrates an embodiment of the fiber circuit, i.e., conductive component, taught by the invention. It will be appreciated by persons skilled in the art that carbon fibers, having high tensile strength, are also very inelastic, having a low strain to failure ratio. In order to maintain a tensile strength and electrical conductivity, a multi-layered braid can be manufactured with the inner layers having differing fiber orientation. Although fiber orientation can be measured or specified in various ways, the angle $\Theta$ (hereafter the "braid angle") of the intersecting fibers forming the braid is used herein. FIG. 14 illustrates a multi-layered braid having an outer layer 250C, middle layer 250B and inner layer 250A. The outer layer 250C is comprised of two fibers A B braided together and crossing at a selected braid angle $\Theta_1$. When subjected to an external force pulling in the axial 270 direction (vector arrow 955), the braid angle decreases and the length of the braided fiber increases. The diameter of the braid may also decrease. The next inner layer of braided fiber, having a larger braid angle $\Theta_2$, has the capacity to further lengthen in response to an external axial load. The next layer, having a larger braid angle $\Theta_3$ can also lengthen. The embodiment of a multi-layered braid component is not limited to three layers. Further, the sequence of layering can be altered, with the inner layers having successively smaller braid angles. Further, the braid fiber layers may be separated by other non-load carrying braid layers. These non-load braid layers can facilitate the movement of other braid layers relative to others braids or the surrounding concrete.

Similarly, design requirements such as wind load, opening supports and buckling can be easily met with the addition of a limited amount of high strength carbon fiber bearing members. It will be appreciated that for wall panels fabricated either on site or manufactured at a central and controlled location, the center of the panel will experience compressive forces and the tension forces will be concentrated at the outer surfaces. Therefore, it will be advantageous to have greater reinforcement at the outer portions of the wall. It will be appreciated that for even and controlled distribution of heat, however, not all of the fiber reinforcement will be required to be energized with electrical current. A slower cure of the concrete matrix in the center section 120 may also take advantage of the higher compressive strength being achieved in the exact location where such higher compressive strength will be beneficial.

The selective placement of reinforcement proximate to the outer surface of the wall is suggested in FIG. 13 wherein the rebar 210 is concentrated closer to the surfaces without any rebar in the center. The fiber circuit 250 can be used to hold the orientation of the rebar after the wall panel is raised to a vertical position.

Figure 15:
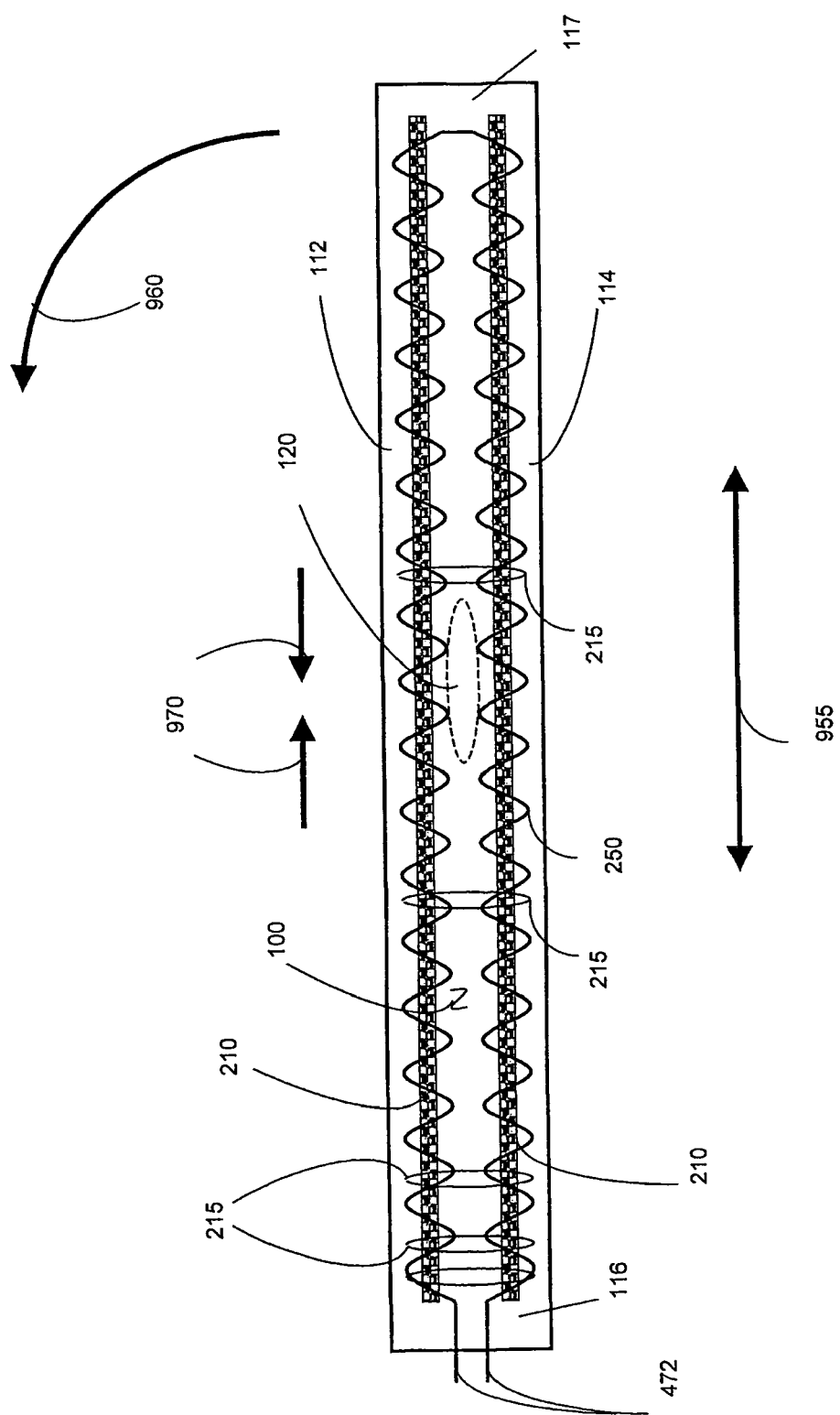
FIGS. 15 and 15A illustrate the reinforcement and heating fibers in a vertical wall panel.

FIG. 15 illustrates a wall panel formed on a horizontal plane; similar to the structure illustrated in FIG. 13. The fiber circuit 250 is wrapped around the rebar 210 placed proximate to each side of the panel wall 112 114. The heating will result in a faster set and hardening of the outer portions 112 114 of the structure. The inner section 120 is not subject to significant heat and therefore will cure (set and harden) more slowly.

Figure 15A:
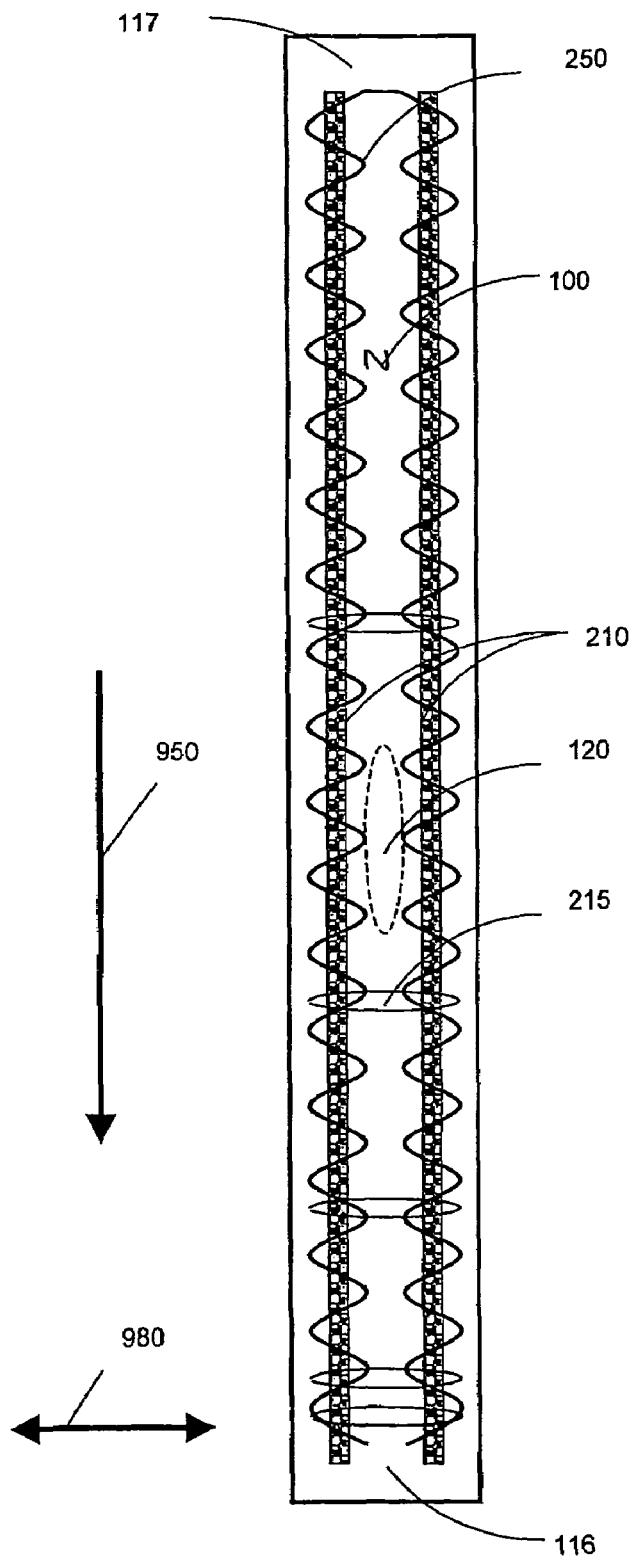

FIG. 15A illustrates the wall panel after being erected. The placement of reinforcement 215 relevant to the changed vectors of load is also illustrated.

It will be appreciated that as the wall panel is elevated from one end 117 in direction shown by vector arrow 960, the top portion of the wall surface 112 will be in compression as shown be vector arrow 970. The opposite side 114 of the panel will be in tension as shown by vector arrow 955. FIG. 15A illustrates the wall panel erected vertically upon end 116. When in this position, the downward load, vector arrow 960, will create an expansive outward force proximate to the lower wall section 116, as shown by vector arrow 980. The rebar is reinforced by the advanced curing of the heated sections of the outer wall of the structure, as well as by supplemental lateral support bands 215 holding the repair 210 in a fixed position.

Utilizing the teaching of this invention, a 600 sq. ft concrete slab achieved a temperature of 120° F. after 10 minutes using a 5 kW generator. In this demonstration, insulated conductive fibers were dispersed each 6 inches on rebar with 8 ohms per meter. Approximately 1000 feet of carbon fiber were utilized.

While specific embodiments have been illustrated and described, numerous modification are possible without departing from the spirit of the invention, as the scope of protection is only limited by the scope of the accompany claims.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What I claim is:

1. A method of curing concrete utilizing at least one heating component within uncured concrete by energizing the heating component with electrical power to resistively heat the concrete to a first temperature wherein the concrete has a fast rate of cure and a rate of compressive strength gain and when the rate of compressive strength gain declines, modifying the electrical power to achieve a second lower concrete temperature with a slower rate of cure.

2. The method of claim 1 wherein the amount of electrical power is modified to achieve a maximum rate of compressive strength gain of the concrete.

3. The method of claim 1 wherein the amount of electrical power is modified to achieve a rate of concrete cure.

4. The method of claim 1 wherein the heating component comprises carbon fibers.

5. The method of claim 1 wherein the heating component provides structural reinforcement to the concrete.

6. The method of claim 2 further comprising modifying the electrical rower to achieve a third lower concrete temperature when the rate of compressive strength gain declines.

7. The method of claim 1 wherein the concrete contains heat responsive additives to activate a hydration reaction.

8. The method of claim 1 wherein the concrete contains additives to retard a hydration reaction.

9. A method of curing concrete comprising:
   a. conducting electrical energy through a heating component wherein at least a portion of the heating component is within concrete;
   b. achieving a first temperature of concrete;
   c. changing the amount of electrical energy so that the concrete achieves a second lower temperature and temporarily achieves a maximum rate of cure;
   d. continuing steps a through c to control a rate of cure of the concrete.

10. A method of curing concrete comprising:
    a. conducting electrical energy through a heating component wherein at least a portion of the heating component is within the concrete;
    b. achieving a first temperature of the concrete;
    c. changing the amount of electrical energy so that the concrete achieves a second lower temperature and temporarily achieves the maximum rate of compressive strength gain;
    d. repeating step c to achieve maximum rate of gain of compressive strength of the concrete.

11. The method of claim 1 further comprising allowing the concrete to cool at a rate that achieves near maximum rate of strength gain for each temperature.

12. The method of claim 1 further comprising allowing the concrete to cool at a rate to achieve a near maximum rate of gain in compressive strength at each temperature.

13. A method for achieving the maximum compressive concrete strength in minimal cure time comprising the following steps:
    (a) heating concrete to a first temperature;
    (b) monitoring changes in the rate of strength gain;
    (c) controllably lowering the resistive heat to achieve a second lower concrete temperature;
    (d) monitoring the rate of strength gain at second temperature to maintain a maximum rate of strength gain;
    (e) controllably decreasing the resistive heat when the rate of strength gain decreases;
    (f) achieving a new third concrete temperature;
    (g) monitoring the rate of strength gain at the third temperature to maintain a maximum rate of strength gain
    (h) controllably decreasing the resistive heat when the rate of strength gain decreases;
    (i) achieving a new fourth concrete temperature; and
    (j) monitoring the rate of strength gain at the fourth temperature to maintain a maximum rate of strength gain.

14. The method of claim 13 further comprising:
    (a) heating the concrete at 50° C. for a time wherein the concrete reaches its maximum rate of strength gain;
    (b) controllably reducing the heat to 35° C.;
    (c) controllably reducing the heat to the higher of ambient temperature or 12.5° C.; and
    (d) controllably reducing the heat to the higher of ambient temperature or 5° C.

* * * * *